US010928882B2

(12) United States Patent
Chen et al.

(10) Patent No.: US 10,928,882 B2
(45) Date of Patent: *Feb. 23, 2021

(54) LOW COST, LOW POWER HIGH PERFORMANCE SMP/ASMP MULTIPLE-PROCESSOR SYSTEM

(71) Applicant: Futurewei Technologies, Inc., Plano, TX (US)

(72) Inventors: Wei Chen, San Diego, CA (US); Konggang Wei, San Diego, CA (US); Tongzeng Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 721 days.

This patent is subject to a terminal disclaimer.

(21) Appl. No.: 14/580,044

(22) Filed: Dec. 22, 2014

(65) Prior Publication Data

US 2016/0109922 A1  Apr. 21, 2016

Related U.S. Application Data

(63) Continuation-in-part of application No. 14/516,314, filed on Oct. 16, 2014, now Pat. No. 9,952,650.

(51) Int. Cl.
*G06F 1/32* (2019.01)
*G06F 1/324* (2019.01)
(Continued)

(52) U.S. Cl.
CPC ............. *G06F 1/324* (2013.01); *G06F 1/10* (2013.01); *G06F 1/3243* (2013.01);
(Continued)

(58) Field of Classification Search
CPC ....................................................... G06F 1/324
(Continued)

(56) References Cited

U.S. PATENT DOCUMENTS 5,475,324 A    12/1995  Tomiyori
5,774,704 A    6/1998   Williams et al.
(Continued)

FOREIGN PATENT DOCUMENTS

CN    1394308 A    1/2003
CN    101086722 A  12/2007
(Continued)

OTHER PUBLICATIONS

"International Application No. PCT/CN2015/091589, International Search Report dated Jan. 7, 2016", 6 pgs.
(Continued)

*Primary Examiner* — Paul Yen
(74) *Attorney, Agent, or Firm* — Schwegman Lundberg & Woessner, P.A.

(57) ABSTRACT

A processing system includes multiple processors in which first processor operates at a first clock frequency and first supply voltage at all times. At least one processor is dynamically switchable to operate at the first clock frequency and first supply voltage resulting in the first and second processors providing symmetrical multi-processing (SMP) or at a second clock frequency and a second supply voltage resulting in the first and second processors providing asymmetrical multi-processing (ASMP). A third processor may be included that also operates at the first clock frequency and the first supply voltage at all times. Various criteria can be used to determine when to switch the at least one switchable processor to improve power consumption and/or performance. A controller enables control and fast-switching between the two modes for the switchable processor. Upon receipt of a switching command to switch between SMP and ASMP, a series or sequence of actions are performed to control a voltage supply and CPU/memory clock to the switchable processor and cache memory.

30 Claims, 19 Drawing Sheets

(51) Int. Cl.
*G06F 1/3234* (2019.01)
*G06F 1/3296* (2019.01)
*G06F 1/10* (2006.01)
*G06F 1/3287* (2019.01)

(52) U.S. Cl.
CPC .......... *G06F 1/3275* (2013.01); *G06F 1/3287* (2013.01); *G06F 1/3296* (2013.01); *Y02D 10/126* (2018.01); *Y02D 10/152* (2018.01); *Y02D 10/172* (2018.01); *Y02D 50/20* (2018.01)

(58) Field of Classification Search
USPC .......................................................... 713/322
See application file for complete search history.

(56) References Cited

U.S. PATENT DOCUMENTS

| | | | |
|---|---|---|---|
| 5,964,881 | A | 10/1999 | Thor |
| 7,555,590 | B2* | 6/2009 | Elliot ........................ G06F 1/12 375/354 |
| 7,668,675 | B2 | 2/2010 | Takita et al. |
| 7,814,252 | B2 | 10/2010 | Hoshaku |
| 8,283,902 | B1 | 10/2012 | Kahn et al. |
| 8,862,926 | B2 | 10/2014 | De Cesare et al. |
| 9,952,650 | B2 | 4/2018 | Chen et al. |
| 10,248,180 | B2 | 4/2019 | Chen et al. |
| 2003/0115239 | A1 | 6/2003 | Togawa |
| 2004/0030942 | A1 | 2/2004 | Barr et al. |
| 2005/0138444 | A1* | 6/2005 | Gaskins .................... G06F 1/08 713/300 |
| 2006/0001410 | A1 | 1/2006 | Ishikawa et al. |
| 2006/0129585 | A1 | 6/2006 | Ishiki et al. |
| 2006/0149975 | A1* | 7/2006 | Rotem .................... G06F 1/206 713/300 |
| 2006/0282692 | A1 | 12/2006 | Oh |
| 2007/0049133 | A1 | 3/2007 | Conroy et al. |
| 2007/0049134 | A1 | 3/2007 | Conroy et al. |
| 2007/0136617 | A1 | 6/2007 | Kanno et al. |
| 2007/0139085 | A1 | 6/2007 | Elliot et al. |
| 2007/0156370 | A1 | 7/2007 | White et al. |
| 2007/0283128 | A1 | 12/2007 | Hoshaku |
| 2008/0005607 | A1 | 1/2008 | Fukatsu |
| 2008/0034236 | A1 | 2/2008 | Takayama et al. |
| 2008/0046770 | A1 | 2/2008 | Jong et al. |
| 2008/0263376 | A1 | 10/2008 | Magklis et al. |
| 2008/0297202 | A1 | 12/2008 | Takita et al. |
| 2009/0063888 | A1 | 3/2009 | Gold et al. |
| 2009/0235108 | A1 | 9/2009 | Gold et al. |
| 2010/0005323 | A1 | 1/2010 | Kuroda et al. |
| 2010/0073068 | A1 | 3/2010 | Cho et al. |
| 2010/0250998 | A1 | 9/2010 | Herdrich et al. |
| 2010/0295530 | A1 | 11/2010 | Kenaga et al. |
| 2011/0173477 | A1 | 7/2011 | Asaba |
| 2011/0283124 | A1 | 11/2011 | Branover et al. |
| 2012/0005535 | A1 | 1/2012 | Shigehara |
| 2012/0060170 | A1* | 3/2012 | Vajda .................... G06F 9/4893 718/104 |
| 2012/0079290 | A1 | 3/2012 | Kumar et al. |
| 2012/0131356 | A1 | 5/2012 | Han |
| 2012/0198207 | A1 | 8/2012 | George et al. |
| 2013/0043917 | A1 | 2/2013 | de Cesare et al. |
| 2013/0060555 | A1 | 3/2013 | Thomson et al. |
| 2013/0111143 | A1 | 5/2013 | Kurihara et al. |
| 2013/0138444 | A1 | 5/2013 | George |
| 2013/0185570 | A1 | 7/2013 | Kumar et al. |
| 2013/0227321 | A1 | 8/2013 | Branover et al. |
| 2013/0246781 | A1 | 9/2013 | Qi et al. |
| 2014/0139197 | A1 | 5/2014 | Price et al. |
| 2014/0173250 | A1 | 6/2014 | Lee et al. |
| 2014/0181556 | A1 | 6/2014 | Eckert et al. |
| 2014/0258760 | A1 | 9/2014 | Wells et al. |
| 2014/0359311 | A1* | 12/2014 | Jahagirdar ................ G06F 1/26 713/300 |
| 2015/0124546 | A1 | 5/2015 | Son et al. |
| 2015/0355700 | A1* | 12/2015 | Pusukuri .................. G06F 1/32 713/323 |
| 2015/0370754 | A1 | 12/2015 | Morimoto et al. |
| 2016/0004292 | A1 | 1/2016 | Sharda et al. |
| 2016/0109921 | A1 | 4/2016 | Chen et al. |
| 2016/0109923 | A1 | 4/2016 | Chen et al. |
| 2018/0232041 | A1 | 8/2018 | Gunther et al. |

FOREIGN PATENT DOCUMENTS

| | | |
|---|---|---|
| CN | 101403944 A | 4/2009 |
| CN | 102404211 A | 4/2012 |
| CN | 102609075 A | 7/2012 |
| CN | 102637134 A | 8/2012 |
| CN | 103229122 A | 7/2013 |
| CN | 103885920 A | 6/2014 |
| EP | 1736851 | 12/2006 |
| EP | 1772795 A1 | 4/2007 |
| JP | 05-259848 A | 10/1993 |
| JP | 10-133766 A | 5/1998 |
| JP | 2004-078642 A | 3/2004 |
| JP | 2004-078940 A | 3/2004 |
| JP | 2005196430 A | 7/2005 |
| JP | 2007047966 | 2/2007 |
| JP | 2008009647 A | 1/2008 |
| JP | 2008040734 A | 2/2008 |
| JP | 2008515065 A | 5/2008 |
| JP | 2008-299731 A | 12/2008 |
| JP | 2009522688 A | 6/2009 |
| JP | 2010-211544 A | 9/2010 |
| JP | 2010-218277 A | 9/2010 |
| JP | 2010-271765 A | 12/2010 |
| JP | 2010-538361 A | 12/2010 |
| JP | 2013-526739 A | 6/2013 |
| JP | 2013-539121 A | 10/2013 |
| JP | 2013539121 A | 10/2013 |
| JP | 2014-507719 A | 3/2014 |
| JP | 2017526996 A | 9/2017 |
| WO | WO-2007/141849 A1 | 12/2007 |
| WO | WO-2009/110290 A1 | 9/2009 |
| WO | WO-2010/035315 A1 | 4/2010 |
| WO | WO-2013080426 A1 | 6/2013 |

OTHER PUBLICATIONS

"International Application No. PCT/CN2015/091589, Written Opinion dated Jan. 7, 2016", 4 pgs.
"International Application No. PCT/CN2015/091655, International Search Report dated Jan. 8, 2016", 6 pgs.
"International Application No. PCT/CN2015/091655, Written Opinion dated Jan. 8, 2016", 5 pgs.
"International Application No. PCT/CN2015/091664, International Search Report dated Jan. 12, 2016", 6 pgs.
"International Application No. PCT/CN2015/091664, Written Opinion dated Jan. 12, 2016", 4 pgs.
U.S. Appl. No. 14/516,314, Advisory Action dated Feb. 21, 2017, 4 pgs.
U.S. Appl. No. 14/516,314, Final Office Action dated Nov. 25, 2016, 26 pgs.
U.S. Appl. No. 14/516,314, Non Final Office Action dated May 9, 2017, 19 pgs.
U.S. Appl. No. 14/516,314, Non Final Office Action dated Jun. 22, 2016, 16 pgs.
U.S. Appl. No. 14/516,314, Reponse filed Apr. 18, 2017 to Final Office Action dated Nov. 25, 2016, 12 pgs.
U.S. Appl. No. 14/516,314, Response filed Feb. 6, 2017 to Final Office Action dated Nov. 25, 2016, 11 pgs.
U.S. Appl. No. 14/516,314, Response filed Sep. 13, 2016 to Non Final Office Action dated Jun. 22, 2016, 9 pgs.
U.S. Appl. No. 14/704,240, Non Final Office Action dated Dec. 13, 2016, 10 pgs.
U.S. Appl. No. 14/704,240, Response filedf Mar. 13, 2017 to Non Final Office Action dated Dec. 13, 2016, 11 pgs.
U.S. Appl. No. 14/516,314, Final Office Action dated Aug. 28, 2017, 13 pgs.

(56) References Cited

OTHER PUBLICATIONS

U.S. Appl. No. 14/516,314, Response filed Aug. 1, 2017 to Non Final Office Action dated May 9, 2017, 13 pgs.
U.S. Appl. No. 14/516,314, Respoonse filed Nov. 28, 2017 to Final Office Action dated Aug. 28, 2017, 13 pgs.
U.S. Appl. No. 14/704,240, Final Office Action dated Nov. 30, 2017, 30 pgs.
U.S. Appl. No. 14/704,240, Non Final Office Action dated Jun. 23, 2017, 28 pgs.
U.S. Appl. No. 14/704,240, Response filed Aug. 16, 2017 to Non Final Office Action dated Jun. 23, 2017, 15 pgs.
European Application No. 15850559.4, Extended European Search Report dated Sep. 13, 2017, (dated Sep. 13, 2017), 12 pgs.
European Application No. 15850680.8, Extended European Search Report dated Aug. 21, 2017, (Aug. 21, 2017), 23 pgs.
European Application No. 15851575.9, Extended European Search Report dated Aug. 10, 2017, (dated Aug. 10, 2017), 21 pgs.
"U.S. Appl. No. 14/704,240, Response filed Jan. 29, 2018 to Final Office Action dated Nov. 30, 2017", 13 pgs.
"European Application No. 15850559.4, Response filed Apr. 4, 2018 to Extended European Search Report dated Sep. 13, 2017", 32 pgs.
"European Application No. 15850680.8, Response filed Jan. 30, 2018 to Extended European Search Report dated Aug. 21, 2017", 48 pgs.
"European Application No. 15851575.9, Response filed Mar. 1, 2018 to Extended European Search Report dated Aug. 10, 2017", 101 pgs.
"Chinese Application No. 201580029078.9, First Office Action dated Aug. 28, 2018", (dated Aug. 28, 2018), 46 pgs.
"Japanese Application No. 2017-520922, Notice of Reasons for Rejection dated Jun. 26, 2018", (dated Jun. 26, 2018), 23 pgs.
"Japanese Application Serial No. 2017-520876, Office Action dated Jun. 5, 2017", (w/ English Translation), 25 pgs.
"Japanese Application Serial No. 2017-520886, Office Action dated Jun. 5, 2018", (w/ English Translation), 5 pgs.
"U.S. Appl. No. 14/704,240, Notice of Allowability dated Feb. 21, 2019", 3 pgs.
"Chinese Application No. 201580056448.8, First Office Action dated Mar. 1, 2019", (dated Mar. 1, 2019), 28 pgs.
"Japanese Applicaton Serial No. 2017-520922, Notice of Reasons for Rejection dated Feb. 19, 2019", (w/ English Translation), (Feb. 12, 2019), 12 pgs.
Sithixay, Douangchak, et al., "Study of Power Saving Control in KVM Virtual Environment Based on Consumption Energy Prediction", (w/ English Abstract), Study Report of Information Processing Society of Japan, Information Processing Society of Japan, vol. 2013-EMB-31, No. 8, (2013), 11 pgs.
Sithixay, Douangchak, et al., "Study on power saving control in virtual environment using KVM", (w/ English Abstract), Study Report of Information Processing Society of Japan, Information Processing Society of Japan, vol. 2013-OS-126, No. 8, (2013), 10 pgs.
"Chinese Application No. 201580056410.0, First Office Action dated Mar. 27, 2019", (dated Mar. 27, 2019), 19 pgs.
"European Application No. 15851575.9, Result of Consultation from European Patent Office dated Oct. 4, 2019", (dated Oct. 4, 2019), 8 pgs.
U.S. Appl. No. 14/516,314, filed Oct. 16, 2014, Hardware Apparatus and Method for Multiple Processors Dynamic Asymmetric and Symmetric Mode Switching.
U.S. Appl. No. 14/704,240, filed May 5, 2015, Fast SMP/ASMP Mode-Switching Hardware Apparatus for a Low-Cost Low-Power High Performance Multiple Processor System.
"India Application No. 201737014289, Examination report dated Oct. 5, 2020", (Oct. 5, 2020), 6 pgs.

* cited by examiner

LOW COST, LOW POWER HIGH PERFORMANCE SMP/ASMP MULTIPLE-PROCESSOR SYSTEM

CROSS-REFERENCE TO RELATED APPLICATION(S)

This application is a continuation-in-part of prior U.S. patent application Ser. No. 14/516,314 filed on Oct. 16, 2014, which is incorporated herein by reference.

TECHNICAL FIELD

The present invention relates generally to multiple processor architectures and systems, and more particularly, to an apparatus and method for switching at least one processor/core in a multi-processor/core system between asymmetric and symmetric multi-processing modes.

BACKGROUND

Multi-processing systems utilize multiple processors (e.g., central processing units (CPU)) to process data and perform desired functions. As will be appreciated, the term "processor" is used synonymously with the terms "CPU" or "core" and is readily understood by those skilled in the art. In the prior art, there exist two main types of disparate multi-processing systems: Symmetric multi-processing (SMP) and asymmetric multi-processing (ASMP).

SMP systems are typically characterized by the sharing of all system resources, a single synchronous L2 cache interface (and possibly asynchronous L2), processors are controlled at the same clock frequency and clock voltage. This also generally means the processors/cores are equally accessible to the shared memory system (such as L2 cache and memory). In SMP, clock frequencies and voltages are not individually adjustable and, therefore, cannot be changed on a per core/processor basis. In addition, the L2 cache is shared among all cores and the L2 cache frequency is not scalable on a per core basis. In most, if not all applications, workloads of the processors in SMP are unbalanced and this leads to higher power consumption. SMP may also be characterized as treating all processors/cores equally (equality).

In contrast, ASMP systems are typically characterized by having different clock frequencies and/or clock voltages individually for processors and the L2 cache clock frequency can be independently scaled. Thus, processor clock frequency and L2 cache frequency can be scaled based on workload (e.g., faster L2 cache relative to cores for memory intensive workloads). In general terms, ASMP systems are more power efficient than SMP systems, but potentially higher power consumption may be caused by the additional and more complex hardware. When the L1 cache miss rate is high, the processor will fetch data from the L2 cache. If the requested relevant data is stored in the lower clock frequency portion of the L2 cache, the processor has to wait for the data. This leads to higher latency and higher power consumption. ASMP may also be characterized as treating all processors/cores differently or unequally (inequality).

Turning to FIG. 1, there is illustrated the basic architecture of a processing system 100 having multiple processors employing ASMP. As will be appreciated, a similar prior art system is utilized for SMP, however, the processors operate at a single clock frequency and using a single supply voltage level—as readily understood by persons of ordinary skill in the art.

The processing system 100 includes a multi-processor cores and caches subsystem 105 having multiple processors 110 (110a, 110b, 110c, 110d) with corresponding L2 cache memory portions 120 (120a, 120b, 120c, 120d) and clock domain crossing (CDC) circuits 130 (130a, 130b, 130c, 130d), as illustrated. Though four processors 110 (and corresponding memory and circuitry) are shown, the number of processors could be fewer or greater, but will include at least two. As will be appreciated, each processor 110 may include one or more central processing units (CPUs).

The processing system 100 further includes a power management control (PMIC) circuit 140 for generating multiple supply voltage signals for use in supplying power to the respective processors, caches and CDCs. Similarly, a clock generation circuit 150 generates multiple clock signals having various predetermined clock frequencies for use in clocking operation of the respective processors, caches and CDCs. As will be appreciated, the PMIC circuit may be on the same substrate as the subsystem 105 or may be provisioned on another substrate (e.g., in another IC).

As noted above and readily understood by those skilled in the art, each of the distinct SMP and ASMP architectures/systems have various advantages or benefits, as well as various disadvantages or drawbacks. Due to the complexity and costs for each type of system (both in hardware and software functionality), a designer typically must choose either the SMP system or the ASMP system based on the particular application(s). Prior art multi-processor systems utilized either ASMP or SMP.

Accordingly, there is needed a multiprocessing system or architecture that can operate and provide both the functionality of an SMP system and an ASMP system at the same time without having duplicate multi-processor cores, caches and CDC subsystems.

SUMMARY

According to one embodiment, there is provided a multi-processing system including a multi-processor (MP) processing system having a plurality of processors which includes a first processor a first processor configured to receive and operate in accordance with a first clock signal having a first predetermined frequency and a first supply voltage having a first predetermined operating voltage, and a second processor configured to receive and operate in accordance with either the first clock signal or a second clock signal having a second predetermined frequency different from the first predetermined frequency and receive and operate in accordance with a second supply voltage having a second predetermined operating voltage different from the first predetermined operating voltage. A controller is coupled to at least the second processor and configured to switch operation of the second processor between a first mode of operation and a second mode of operation. When in the first mode of operation, the second processor receives and operates in accordance with the first clock signal and the first supply voltage, when in the second mode of operation, the second processor receives and operates in accordance with the second clock signal and the second supply voltage, and wherein the first processor is further configured to only receive and operate in accordance with the first clock signal and the first supply voltage during both the first mode and second mode of operation.

According to another embodiment, there is provided an apparatus including a plurality of processors configured to perform multiprocessing functions, the plurality of processors including a plurality of first processors and a second processor. A controller is configured to control operation of the second processor in a first mode and a second mode. The apparatus further includes a clock generation circuit coupled to the controller and configured to generate and output a first clock signal and a second clock signal, and a switching circuit disposed between the clock generation circuit and the second processor and configured to receive the first and second clock signals and select one for output to the second processor, wherein during the first mode of operation the first clock signal is output to the second processor and during the second mode of operation the second clock signal is output to the second processor. During the first mode of operation and the second mode of operation, the first clock signal is input to the plurality of first processors. Cache memory is coupled to and configured for use with the plurality of processors, and a clock-domain crossing (CDC) and bypass circuit responsive to the controller and is coupled to the second processor and the cache memory, and further configured to provide a clock-domain crossing function between the second processor and the cache memory during the second mode of operation and provide a bypassing function during the first mode of operation.

In another embodiment, there is provided a method for switching a plurality of processors between a symmetric multiprocessing (SMP) mode and an asymmetric multiprocessing (ASMP) mode. The method includes operating a first processor in accordance with a first clock signal having a first predetermined frequency and a first supply voltage having a first predetermined operating voltage at all times while the first processor is operating; receiving a mode selection signal; and operating a second processor in a first mode of operation or a second mode of operation in response to the mode selection signal. In the first mode of operation, the second processor is operated in accordance with the first clock signal and the first supply voltage, and in the second mode of operation, the second processor is operated in accordance with a second clock signal having a second predetermined frequency different from the first predetermined frequency and in accordance with a second supply voltage having a second predetermined operating voltage different from the first predetermined operating voltage.

In still another embodiment, there is provided a method for operating a processing system having a plurality of processors in a multiprocessing mode in which at least two processors operate in a symmetric multiprocessing (SMP) mode or an asymmetric multiprocessing (ASMP) mode. The method includes operating the at least two processors in the SMP mode, wherein the at least two processors receive an SMP clock signal having a first predetermined frequency and receive an SMP operating supply voltage having a first voltage, the at least two processor comprising a first processor and a second processor; receiving an instruction to switch from SMP mode to ASMP mode; and switching operation of the at least two processors from SMP mode to ASMP mode. The switching operation includes generating an ASMP clock signal having a second predetermined frequency different from the first predetermined frequency, generating an ASMP operating supply voltage at a second voltage different from the first voltage, inputting the ASMP clock signal and the ASMP operating supply voltage to the second processor, and thereafter operating the second processor at the second predetermined frequency and the second voltage and operating the first processor at the first predetermined frequency and the first voltage.

In accordance with another embodiment, there is provided a multi-processor (MP) processing system having a plurality of processors including a first processor and a second processor each configured to receive and operate in accordance with a first clock signal having a first predetermined frequency and a first supply voltage having a first predetermined operating voltage, a third processor configured to receive and operate in accordance with either the first clock signal or a second clock signal having a second predetermined frequency different from the first predetermined frequency and receive and operate in accordance with a second supply voltage having a second predetermined operating voltage different from the first predetermined operating voltage, and a fourth processor configured to receive and operate in accordance with either the first clock signal or a third clock signal having a third predetermined frequency different from the first predetermined frequency and receive and operate in accordance with a third supply voltage having a third predetermined operating voltage different from the first predetermined operating voltage. A controller is coupled to at least the third and fourth processors and configured to switch operation of the third and fourth processors between a first mode of operation and a second mode of operation. When in the first mode of operation, the third processor and the fourth processor each receives and operates in accordance with the first clock signal and the first supply voltage, and when in the second mode of operation, the third processor receives and operates in accordance with the second clock signal and the second supply voltage and the fourth processor receives and operates in accordance with the third clock signal and the third supply voltage. The first processor and the second processor are further configured to only receive and operate in accordance with the first clock signal and the first supply voltage during both the first mode and second mode of operation.

In still another embodiment, there is provided a method of switching a plurality of processors between a symmetric multiprocessing (SMP) mode and an asymmetric multiprocessing (ASMP) mode. The method includes operating a first processor and a second processor in accordance with a first clock signal having a first predetermined frequency and a first supply voltage having a first predetermined operating voltage at all times during operation of the first processor and the second processor; receiving a mode selection signal; and operating a third processor and a fourth processor both in a first mode of operation or a second mode of operation in response to the mode selection signal. In the first mode of operation, operating the third processor and the fourth processor in accordance with the first clock signal and the first supply voltage, and in the second mode of operation, operating the third processor in accordance with a second clock signal having a second predetermined frequency different from the first predetermined frequency and in accordance with a second supply voltage having a second predetermined operating voltage different from the first predetermined operating voltage, and operating the fourth processor in accordance with a third clock signal having a third predetermined frequency different from the first predetermined frequency and in accordance with a third supply voltage having a third predetermined operating voltage different from the first predetermined operating voltage.

In yet another embodiment, there is provided a method of processing in a multiprocessor system having a plurality of processors. The method includes processing within the multiprocessor system using only a first active processor within the plurality of processors; determining a second processor should be activated for processing within the multiprocessor system; in response to the determination, activating the second processor; processing within the multiprocessor system using the first active processor and the second active processor in accordance with either a symmetric multiprocessing (SMP) mode or an asymmetric multiprocessing (ASMP) mode. When in the SMP mode, the first active processor and the second active processor each operate in accordance with a first clock signal having a first predetermined frequency and a first supply voltage having a first predetermined voltage, and when in the ASMP mode, the first active processor operates in accordance with the first clock signal and the first supply voltage and the second processor operates in accordance with a second clock signal having a second predetermined frequency different from the first predetermined frequency and in accordance with a second supply voltage having a second predetermined operating voltage different from the first predetermined operating voltage. The method also includes receiving a mode selection signal and switching operation of the first active processor and the second active processor from either the SMP mode to the ASMP mode or the ASMP mode to the SMP mode depending on the mode selection signal.

In another embodiment, there is provided a multi-processor (MP) processing system having a plurality of processors including a first processor and a second processor. A controller is coupled to at least the second processor and configured to: activate or deactivate the second processor in response to an activation/deactivation signal, and upon activation of the second processor, control processing within the multiprocessor system using the first processor and the second processor in accordance with either a symmetric multiprocessing (SMP) mode or an asymmetric multiprocessing (ASMP) mode. The SMP mode is defined where the first processor and the second processor each operate in accordance with a first clock signal having a first predetermined frequency and a first supply voltage having a first predetermined voltage, and the ASMP mode is defined where the first processor operates in accordance with the first clock signal and the first supply voltage and the second processor operates in accordance with a second clock signal having a second predetermined frequency different from the first predetermined frequency and in accordance with a second supply voltage having a second predetermined operating voltage different from the first predetermined operating voltage. The controller is also configured to receive a mode selection signal and switch operation of the first processor and the second processor from either the SMP mode to the ASMP mode or the ASMP mode to the SMP mode depending on the mode selection signal.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
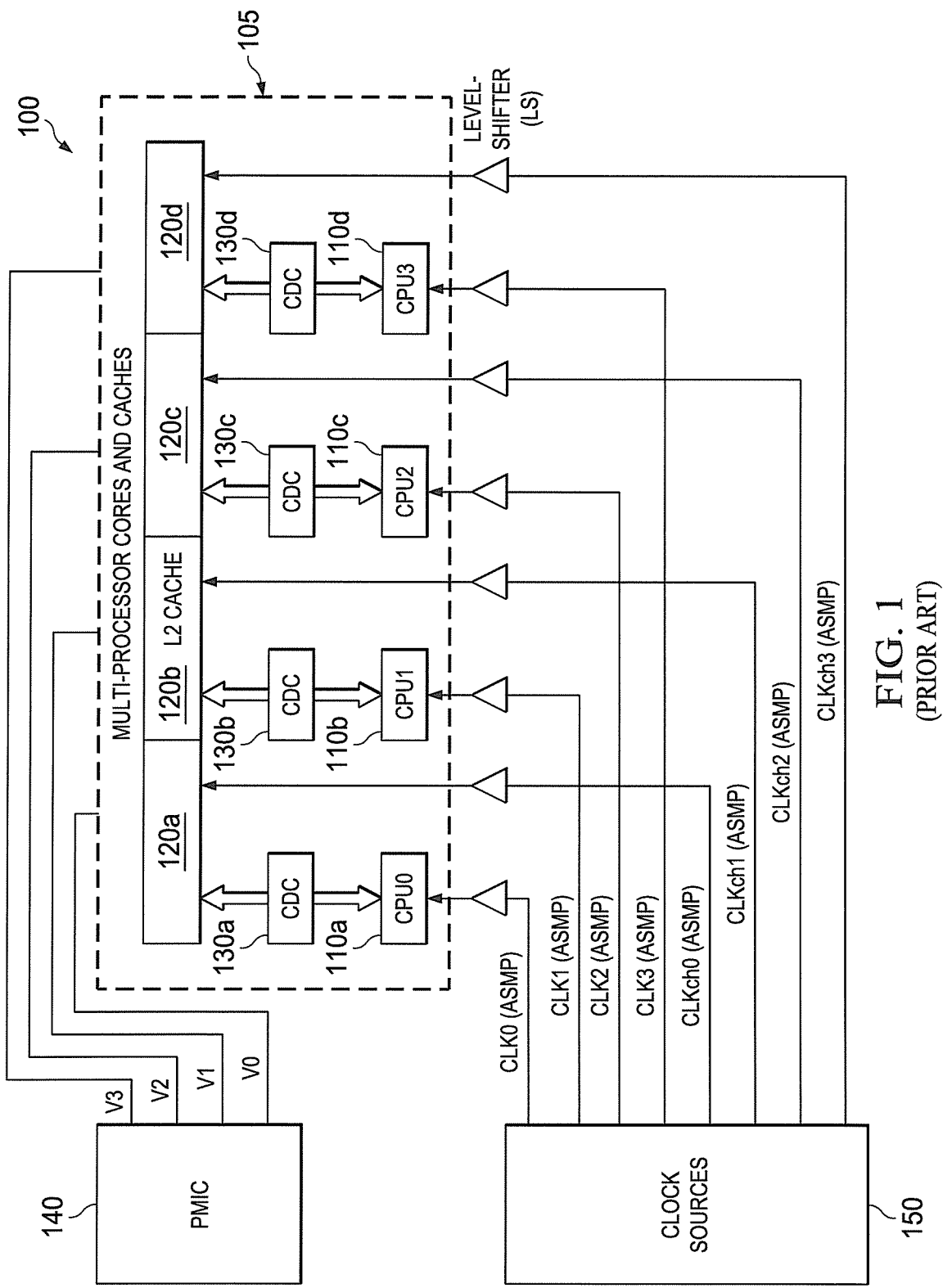
FIG. 1 illustrates an example prior art asymmetric multiprocessing system (ASMP)

FIGS. 1 through 11, discussed herein, and the various embodiments illustrated therein and principles described below of the present disclosure in this patent document are by way of illustration only and should not be construed in any way to limit the scope of the invention. Those skilled in the art will understand that the principles described herein may be implemented in any type of suitably arranged device(s) or system(s).

It has been discovered that when switching operation of a group of processors/cores from a fully SMP system to a fully ASMP system, the cost and complexity (hardware/software) associated with providing this SMP/ASMP dynamic switching functionality may be significant. For smaller devices (e.g., mobile devices, handheld devices, smartphones, etc. in mobile applications as opposed to supercomputing devices and applications), it has been determined through investigation and testing that in most use applications, multiprocessing tasks/functions can be adequately handled using two (or less) processors/cores. In most of these applications, the two processors/cores will be running with unbalanced loads resulting in higher power consumption.

Therefore, it would be beneficial to have a low cost, low power and high performance multi-processing system capable of operating in an ASMP manner—but in which only a single processor/core (or subset) of the processors/ cores is configured and enabled for dynamic switching between different clock frequencies and/or different operating supply voltages—and with the remaining processors/cores configured at a same clock frequency and a same supply voltage. For example, if the multiprocessor system includes two processors/cores, a first processor/core operates at a first clock frequency (not dynamically changeable) and a first supply voltage (not dynamically changeable) and the second processor/core is switchable between operation at either that first frequency and first supply voltage (the same as the first processor/core) or a different frequency and different supply voltage. This may also be applied in a system having three or more processors/cores in which at least one of the processor/cores (or subset) has this dynamic switching capability.

It may also be beneficial to have a method for controlling and selecting at least one processor/core in a group of processors/cores to operate at the same clock frequency and supply voltage as all other processors/cores in the group (thereby collectively operating in SMP mode) or to operate at a different clock frequency and supply voltage as the other processors/cores (thereby collectively operating in an ASMP mode). Such a system and method reduce implementation costs and power consumption, and increase efficiency.

In general terms, the embodiments illustrated with respect to FIGS. 1-11 in the present application describe a processing system with multiple processors/cores that is switchable between two modes of operation: symmetrical multi-processing (SMP) and asymmetrical multi-processing (ASMP). The system includes a hardware apparatus that enables control and switching between the two modes. Within the hardware, upon receipt of a switching command from the operating system (OS) or other software/hardware, to switch between SMP and ASMP, a series or sequence of action is performed to control clocks and voltages to the multiple processors and memory. The generation of the switching command can be based on one or more factors, as desired, such as loading, cache miss rate, power consumption reasons, etc. The apparatus ensures that the system does not fail during the transition from one mode to the other and clocks to the processors/memory are switched glitchlessly. The apparatus/method minimizes software/OS intervention and has faster mode-switch speed.

As used herein, the term SMP generally refers to processing using multiple processors/CPUs/cores operating at a same clock (frequency) and same voltage supply utilizing a shared memory system (with L2 cache memory operating with the same clock and voltage supply). The term ASMP generally refers to processing using multiple processors/CPUs/cores with at least two operating with a different clock (frequency) and/or voltage supply. In ASMP, typically the processors each utilize different L2 cache memory. However, ASMP may also include sharing of the same L2 cache memory (referred to as heterogeneous ASMP). In another aspect, the term ASMP refers to multi-processing using multiple processors/CPUs/cores in which each processor/CPU/core is configured to operate using at least either a first clock frequency and a first supply voltage or a second clock frequency and a second supply voltage. More than two such clock/voltage combinations are also contemplated. In this aspect, all of the processors/CPUs/cores (2 or more) can be configured to operate either in SMP mode (all using same clock frequency and voltage) or ASMP mode (all using different clock frequencies and voltages).

As will be appreciated, the present disclosure also provides for various other embodiments of the SMP/ASMP system described in FIGS. 12-19—which are similar to that described with respect FIGS. 1-11—except in these embodiments the clock frequency and supply voltage input to only a subset (at least one, and less than all) of the processors/cores are dynamically switchable or programmable to receive different clock frequencies and/or different voltage supply levels.

The present application further describes various methods for mode switching (dynamic/static or manual/intelligent) between the SMP and ASMP modes of operation (e.g., generation of the switching command). In one method, SMP mode is selected under light load conditions or when L1 cache miss rate is high. ASMP is selected under heavy and unbalanced load conditions. Also, a learning mode is introduced which can be used facilitate fast mode selection in real time. The overall benefits can include lower power when loads are unbalanced, better performance with fewer cache misses, and the ability to manually or intelligently switch modes.

Figure 2:
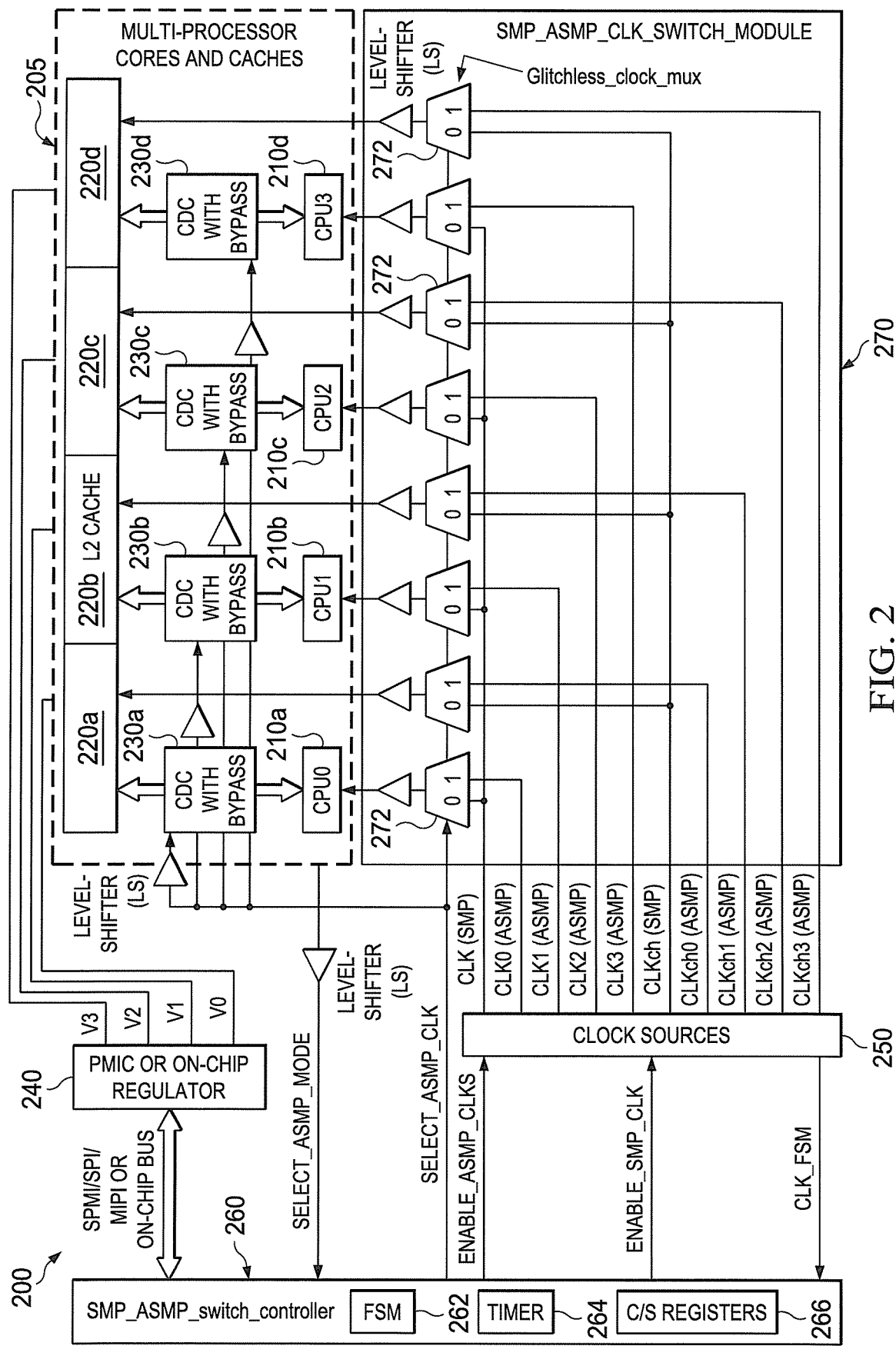
FIG. 2 is a diagram illustrating an example multiprocessing system according to certain embodiments of the present disclosure.

Now turning to FIG. 2, there is shown a detailed diagram illustrating a processing system 200 in accordance with the present disclosure. The processing system 200 includes a multi-processor cores and caches subsystem 205 having multiple processors 210 (210a, 210b, 210c, 210d) with corresponding L2 cache memory portions 220 (220a, 220b, 220c, 220d) and cross-domain clock (CDC) with bypass circuits 230 (230a, 230b, 230c, 230d), as illustrated. While four processors 210 (and corresponding memory and circuitry) are shown, the number of processors could be fewer or greater, but will include at least two. As will be appreciated, each processor 210 may include one or more central processing units (CPUs) or cores.

The processing system 200 further includes a power management control (PMIC) circuit 240 for generating multiple supply voltage signals for use in supplying power to the respective processors, caches and CDCs. Similarly, a clock generation circuit 250 generates multiple clock signals having various predetermined clock frequencies for use in clocking operation of the respective processors, caches and CDCs.

In one embodiment, with the exception of the PMIC circuit 240, the processing system 200 is disposed or otherwise located on a single integrated semiconductor substrate/die (or within multiple semiconductor substrates disposed within a multi-substrate IC package). In another embodiment, the PMIC circuit 240 may also be included on the single integrated semiconductor substrate/die.

As illustrated, the processing system 200 also includes a controller 260 (which may also be referred to as a mode controller) and a clock switching circuit (or module) 270. As will be understood, the controller 260 outputs various control signals for controlling the functionality and operation of the clock generation circuit 250, the PMIC circuit 240, the "CDC with bypass circuits" 230 and the clock switching circuit 270.

The clock generation circuit 250 includes the necessary circuitry and elements for generating multiple clock signals, including one SMP processor clock signal (CLK) for controlling operational speed of all of the processors 210 collectively, one SMP memory clock signal (CLKch) for controlling operational speed of all of the cache portions 220 collectively, four ASMP processor clock signals (CLK0, CLK1, CLK2, CLK3) enabling independent control of the operational speed of each of the four processors (210a, 210b, 210c, 210d), and four ASMP memory clock signals (CLKch0, CLKch1, CLKch2, CLKch3) enabling independent control of the operational speed of each of the cache memory portions (220a, 220b, 220c, 220d). Any of these clocks are enabled or disabled glitchlessly by the circuit 250. The clock generation circuit 250 also generates a controller clock signal (CLK_FSM) for use by the controller 260.

The PMIC circuit 240 includes the necessary circuitry and elements for generating multiple operating supply voltages or signals for use by respective portions of the subsystem 205. As illustrated, the PMIC circuit 240 generates and outputs four operating supply voltages (V0, V1, V2, V3) that supply power to each respective group of processing units. In other words, operating supply voltage V0 supplies power to the processor 210a, the cache memory portion 220a and the CDC with bypass circuit 230a, while voltage supply V1 supplies power to the processor 210b, the cache memory portion 220b and the CDC with bypass circuit 230b, etc. As understood by those skilled in the art, when a processor/memory operates at a higher clock speed, it is desirable and may be necessary to also operate the processor/memory with a higher supply voltage. In addition, when a core is not used, it can be power collapsed or clock-disabled.

In will be understood that the clock generation circuit 250 may also include functionality and circuitry enabling programmability to each of the generated clock signals. In one embodiment, each of the clock signals may be programmable to one of many possible frequencies (e.g., the CLK may be programmable between a range such as 300 Mhz to 3 GHz). In another embodiment, only certain clock signals may be programmable, while in other embodiments, the frequency of each clock signal is predetermined and fixed. In yet another embodiment, the frequencies may be fixed relative to each other, but may be programmable as a group.

Similarly, the PMIC circuit 240 may also include functionality and circuitry to provide programmability to each of the generated operating voltage supplies V0, V1, V2, V3. In one embodiment, each supply may be programmable to one of many possible voltage levels (e.g., the voltage may be programmable between a range such as 0.5 volts and 3.3 volts). In another embodiment, only certain voltage power supplies may be programmable, while in other embodiments, the voltage level of each supply is predetermined and fixed. In yet another embodiment, the voltage levels may be fixed relative to each other, but may be programmable as a group. Though not shown, in another embodiment, a base operating voltage supply may be generated in addition to the four shown. In this case, the base voltage supply and the other four could be used as inputs to multiplexing circuitry (similar to the multiplexers 272 shown in the clock switching circuit 270).

In another embodiment (not shown), one or more of the respective processor/L2 cache memory pairs may have different power supply voltage signals—a "split-rail" system. In such a system, the L2 cache memory and its associated processor have different voltage supply rails. As will be appreciated, one or more (or all) of the pairs may have a split rail voltage supply. Therefore, in this embodiment, the generated operating voltage supplies V0, V1, V2, V3 may be split and include separate supplies V0 (processor) and V0 (cache), and so on, etc. These may be programmable independently or as one or more groups. In this embodiment, the system 200 may further include voltage-domain crossing circuits (not shown) separate from, or included within, the CDC circuits 230.

The mode or switch controller 260 includes a finite state machine (FSM) 262, one or more timers 264, and one or more storage registers 266 (such as configuration or status registers). The controller 260 functions to control and perform a sequence of actions or processes in response to assertion of a switch command (SELECT_ASMP_MODE). Therefore, in the illustrated embodiment, when the switch command is asserted/unasserted, the mode of operation is switched between the ASMP mode and the SMP mode. Various methods and mechanisms may be used for generation of the switch command, and some examples are described below with respect to FIGS. 8-11.

Using enable signals (ENABLE_ASMP_CLKS, ENABLE_SMP_CLK), the controller 260 controls the clock generation module 250 to enable the clocks prior to SMP/ASMP switching. The controller 260 also controls the PMIC circuit 240 module to program or change the operating supply voltages V0, V1, V2, V3 prior to switching (and after switching). In one embodiment, the controller 260 may communicate with the PMIC circuit 240 over a communication bus or interface, such as a SPMI/SBI/MIPI, if the PMIC circuit 240 is external to the processors (e.g., off-chip). If the PMIC circuit is not external, other communication path(s) may be utilized.

It will be understood that the switch command (SELECT_ASMP_MODE) may be generated in response to various events and by various elements within or external to the processing system 200. In the embodiment shown, the switch command is generated from the multi-processor cores and caches subsystem 205, but other it may be generate by other sources.

When actual switch over from the SMP clock to the ASMP clocks (and vice versa) occurs, the controller 260 generates an ASMP select signal (SELECT_ASMP_CLK) that selectively multiplexes the ASMP clock signals to the processors using multiplexers 272 within the clock switching circuit 270. As understood, the clocks for the processor/CPU cores 210 in the ASMP mode are denoted as CLK0, CLK1, CLK2, CLK3 while the clock for the processor/CPU cores 210 in the SMP mode is denoted CLK. Thus, the SELECT_ASMP_CLK signal selects which clocks to use glitchlessly. In one embodiment, when SELECT_ASMP_CLK is asserted (logic high or "1"), the clock signals CLK0, CLK1, CLK2, CLK3 are selected and input to the processors/cores 210a, 210b, 210c and 210d, respectively. When SELECT_ASMP_CLK is unasserted (logic low or "0"), the clock CLK is selected and input to all of the processors/cores 210a, 210b, 210c and 210d. The timing of various events and actions during the switching is controlled by in accordance with the FSM 262 with use of the one or more timers 264. As will be described in more detail below, a clock warm-up period and a voltage ramp up/ramp down period are utilized. These values can be pre-programmed or pre-set and stored in the C/S registers or other memory locations (none shown) in the controller by software or other methods.

As will be appreciated, and though not specifically identified with reference numerals, various other logic circuits can be included, such as for example, level shifters. Level shifters are typically utilized when a signal crosses power domains.

Figure 3A:
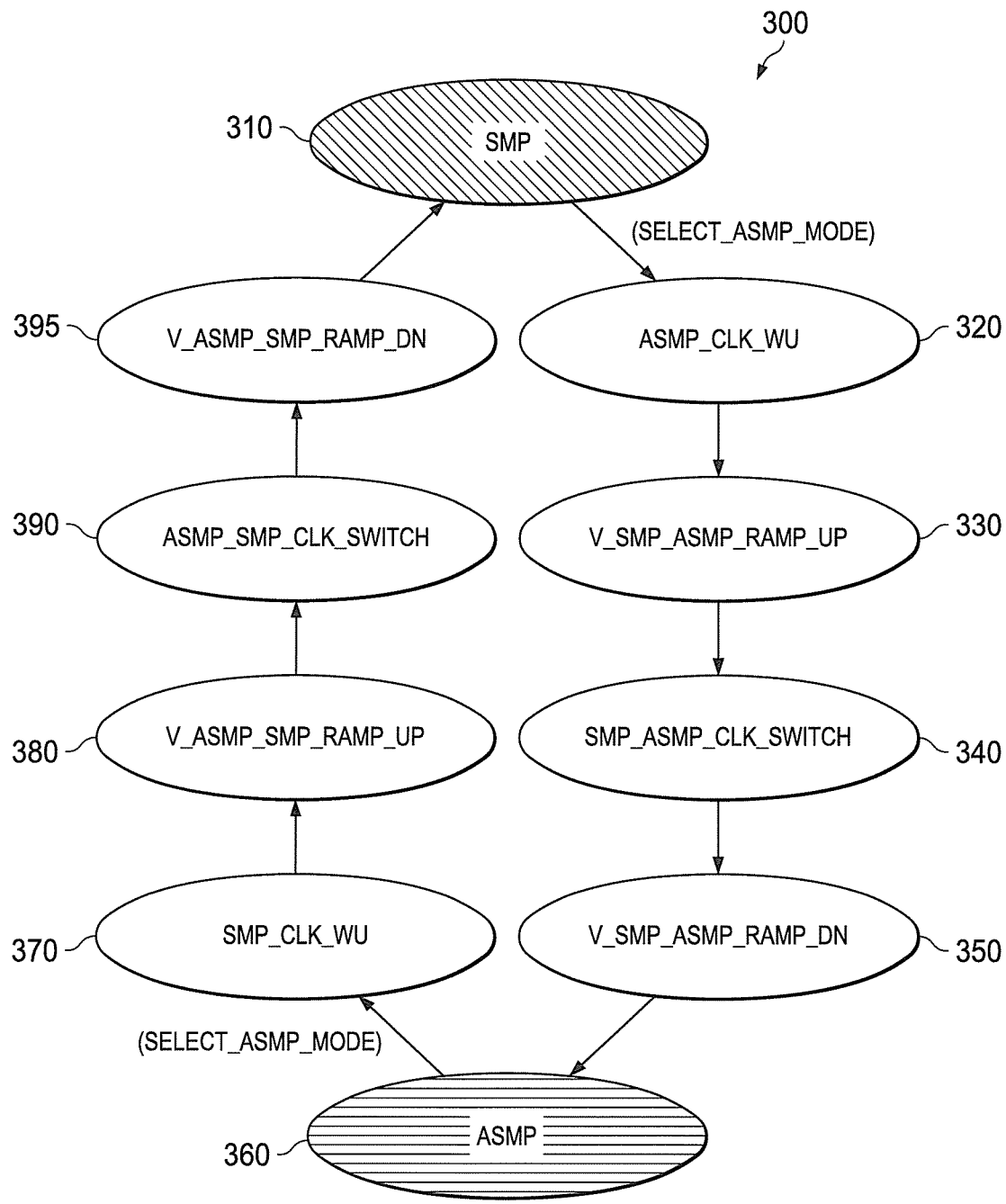
FIGS. 3A, 3B and 3C illustrate an example finite state machine (FSM) and process for use with the system shown in FIG. 2 according to the present disclosure.
Figure 3B:
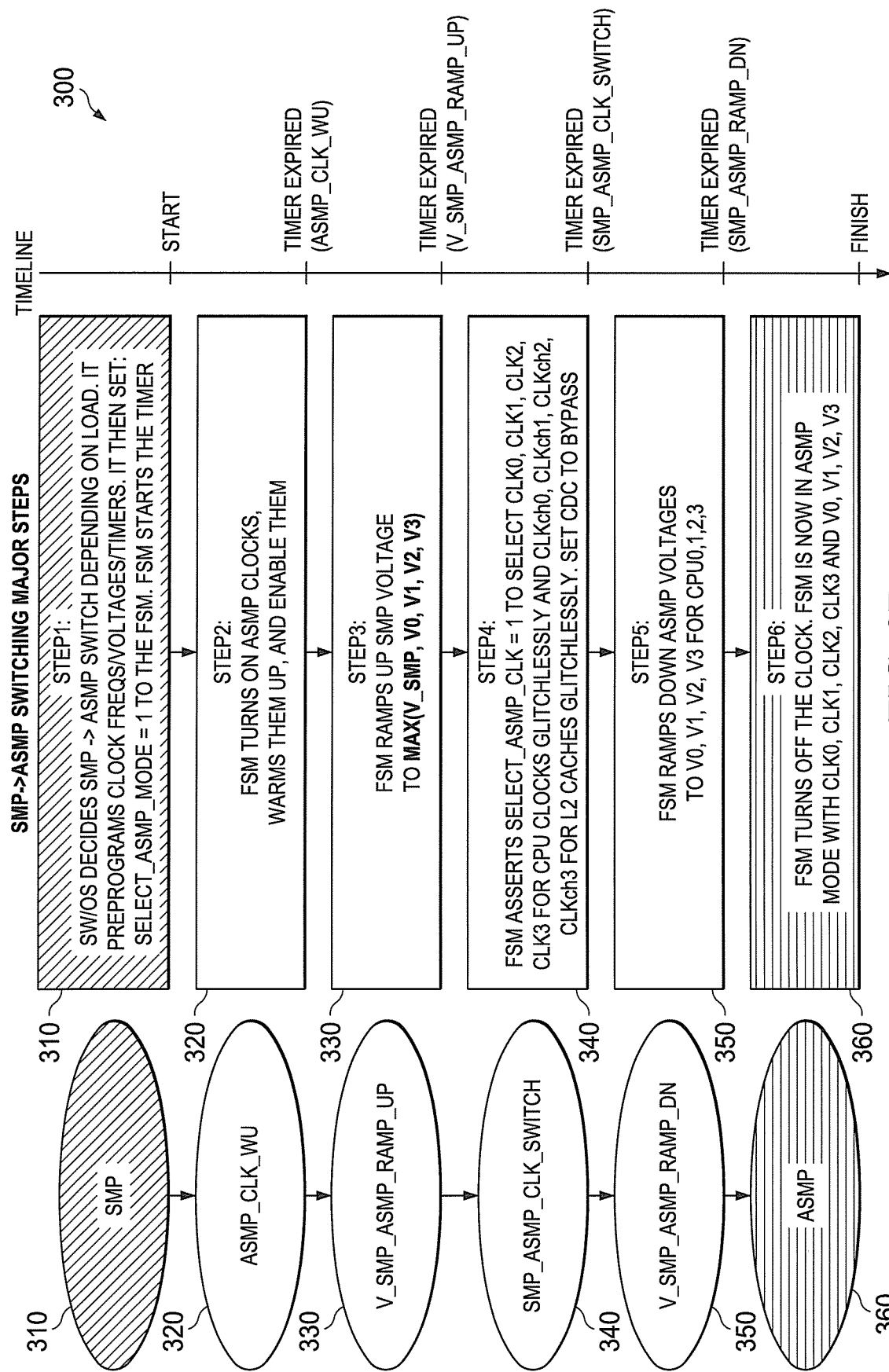
Figure 3C:
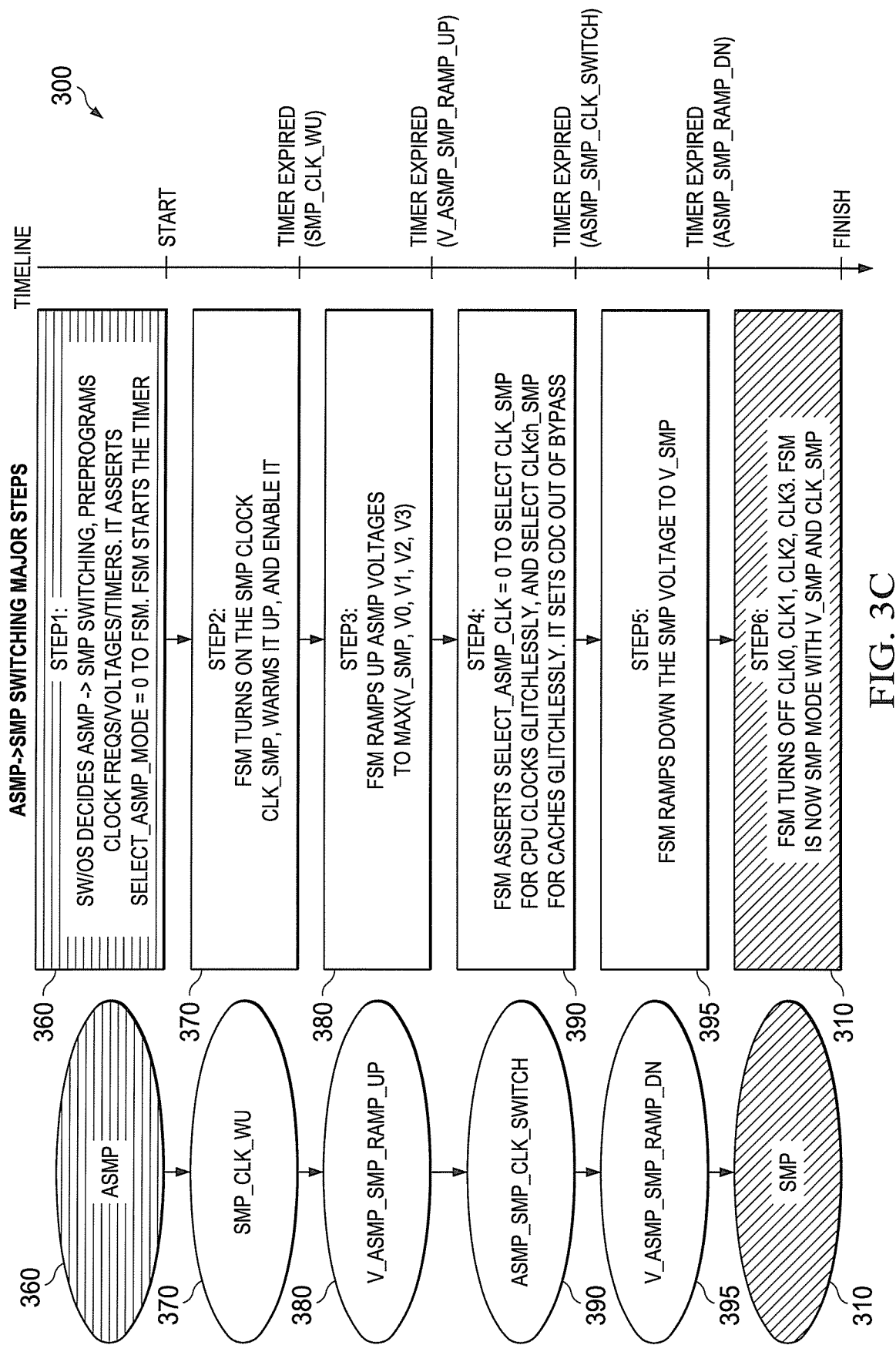

Now turning to FIGS. 3A, 3B and 3C, there is illustrated a process or method 300 performed or implemented by the FSM 262. As will be appreciated, this process/functionality of the FSM 262 may be implemented using different configurations, methods or structures (or combinations thereof) or methods. For example, although implemented in the illustrated embodiment as a finite state machine (e.g., hardware implementation), the controller 206 functionality may alternatively be implemented using software, a microcontroller with firmware, etc., and any combination thereof, or in any other manner/way known to those skilled in the art. The FSM 262 advantageously operates at a faster speed and minimizes software/OS intervention. In the event of exceptions, e.g., timeout, etc., it will generate an interrupt to the system processor.

As shown in FIGS. 3A, 3B and 3C, the process 300 represented by the state diagram of the FSM 262 includes various states and transitions. In a state 310, the processing system 200 is operating in the SMP mode. When a switching command (SELECT_ASMP_MODE) is received, a state 320 (ASMP_CLK_WU) is entered in which the ASMP clocks are enabled and activated (using the ASMP clock enable signal) and "warmed up". After completion of a predetermined warm-up time period (timer), a state 330 (V_SMP_ASMP_RAMP_UP) is entered in which the all of the operating voltage supplies V, V0, V1, V2, V3 are increased (if necessary) to a predetermined maximum voltage level (MAX). The predetermined maximum voltage level is equal (or greater than) the highest voltage level that V1, V2, V3, V4 will have during operation of the processing system 200 in the ASMP mode. For example, if the four processors are currently operating at 1.5 volts (in the SMP mode), and in the ASMP mode, the four processors will operate at 1.2, 1.9, 1.7 and 1.7 volts, respectively, then all of the operating supply voltages V1, V2, V3 and V4 are increase to 1.9 volts (or more).

After these four operating voltage supply voltages reach the predetermined maximum voltage (MAX), then a state 340 (SMP_ASMP_CLK_SWITCH) is entered. In this state 340, the clock switching signal is asserted and the clocks (all equal to the frequency of CLK SMP) of the processors 210 and memory 220 are switch from the SMP clock signal to the ASMP clock signals. As shown, the multiplexers 272 are switched to output the respective ASMP clock signals CLK1, CLK2, CLK3, CLK4 instead of the SMP clock signal CLK. At this same time, the CDC with bypass circuits 230 are also set to a bypass mode enabling the ASMP clock signals to bypass the clock domain circuitry in the CDC with bypass circuits 230. Also, at this time, the SMP clock signal generated by the clock generation circuit 250 may be deactivated.

After these events are completed, a state 350 (V_SMP_ASMP_RAMP_DN) is entered which triggers a ramp down procedure for operating supply voltages V1, V2, V3, V4. Because all the processors 210 (and memory 220) are operating at the MAX operating supply voltage (in the example above, 1.9 volts) and the desired operating supply voltages for V1, V2, V3 and V4 in ASMP mode are different (in the example above, 1.2, 1.9, 1.7 and 1.7 volts, respectively), the voltage levels of V1, V3 and V4 are reduced to voltage levels desired in the ASMP mode.

After the operating supply voltages are ramped-down (e.g., set to the desired voltage levels for each processor in the ASMP mode), a state 360 is entered. In this state, the processing system 200 is now operating in the ASMP mode with each of the respective processor/memory combinations, e.g., 210a/220a, 210b/220b, 210c/220c, and 210d/220d, operating in accordance with clock and voltage signal combinations CLK0/V0, CLK1/V1, CLK2/V2, CLK3/V3, respectively.

It will be understood that in different embodiments, one or more steps performed by the FSM 262 may be omitted or bypassed. For example, if all the voltages are the same, the V_SMP_ASMP_RAMP_UP and V_SMP_ASMP_RAMP_DN states may not be necessary and may be omitted. In this example, this would reduce any mode-switching latency. In some other embodiments, the clocks voltages must be ramped up before the clocks are switched.

As note previously, the clock voltage and frequency values may be predetermined by software/OS using the methods described herein and can be pre-stored or programmed into C/S registers (or other memory locations) in the controller prior to initiating switching. In another embodiment, the system may determine the clock voltage and/or frequency values (from one of several possible values) during operation based on real-time operating characteristics or parameters. These values (or an identifier of these values) may then be stored in the C/S register (or some other memory locations).

A similar process is followed when switching from the ASMP mode to the SMP mode. In the state 360, the processing system 200 is operating in the ASMP mode. When a switching command (SELECT_ASMP_MODE—unasserted) is received, a state 370 (SMP_CLK_WU) is entered in which the SMP clock (CLK) is enabled and activated (using the SMP clock enable signal) and "warmed up". After completion of a predetermined warm-up time period (timer), a state 380 (V_ASMP_SMP_RAMP_UP) is entered in which the all of the operating voltage supplies V0, V1, V2, V3 are increased (if necessary) to a predetermined maximum voltage level (MAX). The predetermined maximum voltage level is equal to (or greater than) the highest voltage level that V1, V2, V3, V4 are currently supplying in the ASMP mode (or to the desired SMP voltage level V_SMP if that level is higher than all of the levels of V1, V2, V3 and V4). For example, if the four processors are currently operating at 1.2, 1.9, 1.7 and 1.7 volts (in the ASMP mode), and in the SMP mode, the four processors will operate at 1.5 volts (V_SMP), respectively, then all of the operating supply voltages V1, V2, V3 and V4 are increase to 1.9 volts (or more).

After these four operating voltage supply voltages reach the predetermined maximum voltage (MAX), then a state 30 (ASMP_SMP_CLK_SWITCH) is entered. In this state 390, the clock switching signal is asserted and the clocks (all possibly different from the frequency of the SMP clock signal CLK) of the processors 210 and memory 220 are switched from the ASMP clock signals CLK0, CLK1, CLK2, CLK3 to the SMP clock signal CLK. As shown, the multiplexers 272 are switched to output the SMP clock signal (CLK) instead of the ASMP clock signals. At this same time, the CDC with bypass circuits 230 are also set to operate using the clock domain circuitry (and disable the bypass mode) enabling the SMP clock signal to proceed through the clock domain circuitry in the CDC with bypass circuits 230. Also, at this time, the ASMP clock signals generated by the clock generation circuit 250 may be deactivated.

After these events are completed, a state 395 (V_ASMP_SMP_RAMP_DN) is entered which triggers a ramp down procedure for operating supply voltages V1, V2, V3, V4. Because all the processors 210 (and memory 220) are operating at the MAX operating supply voltage (in the example above, 1.9 volts) and the desired operating supply voltage is V_SMP in the SMP mode (in the example above, 1.5 volts) which is lower than the current voltage levels (1.9 volts in the example), all of the operating supply voltages V1, V2, V3 and V4 are reduced to the V_SMP level in the desired SMP mode (1.5 volts).

After the operating supply voltages are ramped-down (e.g., set to the desired SMP voltage level for each processor in the SMP mode), the state 310 is entered. In this state, the processing system 200 is now operating in the SMP mode with each of the respective processor/memory combinations, e.g., 210a/220a, 210b/220b, 210c/220c, and 210d/220d, operating in accordance with a single clock and voltage signal combination CLK/V_SMP.

It will be understood that in different embodiments, one or more steps performed by the FSM 262 may be omitted or bypassed. For example, if all the voltages are the same, the V_ASMP_SMP_RAMP_UP and V_ASMP_SMP_RAMP_DN states may not be necessary and may be omitted. In this example, this would reduce any mode-switching latency. In some other embodiments, the clocks voltages must be ramped up before the clocks are switched.

Figure 4:
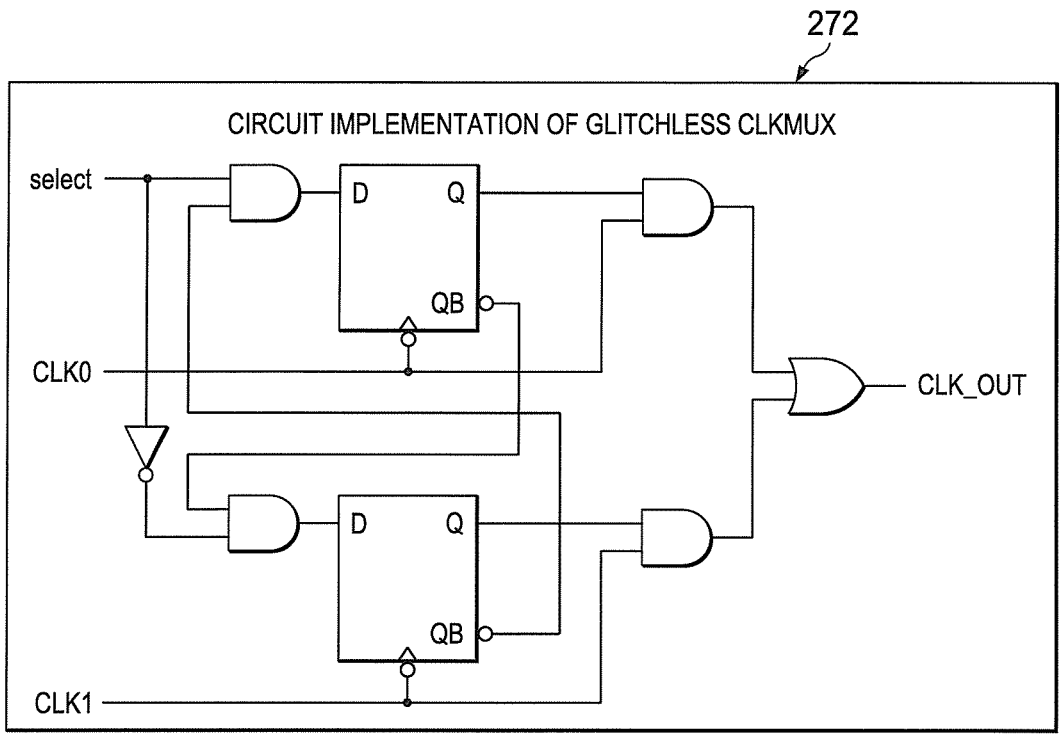
FIG. 4 is a diagram illustrating one implementation of a glitchless clock in accordance with the present disclosure.

Now turning to FIG. 4, there is shown one circuit implementation of the clock multiplexer 272 (shown in FIG. 2). In this embodiment, the clock multiplexers 272 are "glitchless" which means there is no glitch during switching. Other suitable circuit implementations may be utilized for the clock multiplexers 272, and those of ordinary skill in the art will readily understand other circuits can be used that perform glitchless multiplexer switching.

Figure 5:
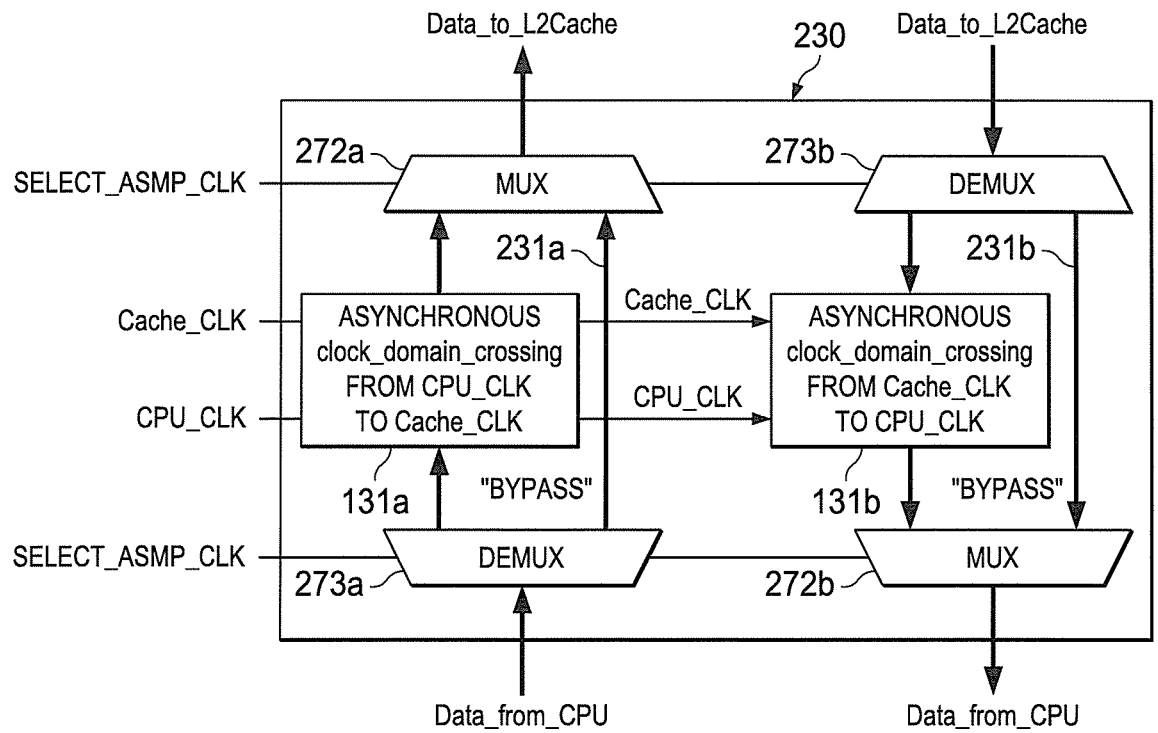
FIG. 5 is a block diagram of a clock domain crossing (CDC) and bypass circuit in accordance with the present disclosure.

Turning to FIG. 5, there is shown one implementation of the CDC with bypass circuits 230 (shown in FIG. 2). It will be understood that in the prior art ASMP system (See FIG. 1), the CDC circuits 130 each included two asynchronous clock domain crossing (CDC) circuits 131a, 131b disposed between the respective processors 210 and L2 cache portions 220. As will be appreciated, the asynchronous CDC circuits 131 are known in the art and, therefore, persons of ordinary skill the art will understand how to implement such functionality. These CDC circuits and/or their functionality may also be known in the art as clock-switching circuits, or as an asynchronous FIFO bridge between the processor and L2 cache.

The CDC with bypass circuits 230 further include a first multiplexer 272a, a first demultiplexer 273a, and a first BYPASS line 231a associated with the asynchronous CDC circuit 131a—as shown in FIG. 5. A second multiplexer 272b, a second demultiplexer 273b, and a second BYPASS line 231b are associated with the asynchronous CDC circuit 131b—as shown in FIG. 5. When switching between modes (e.g. between CDC asynchronous mode and synchronous bypass mode) in the CDC circuits 230, the CDC circuits 230 perform "glitchless" switching to ensure no failures due to potential glitches.

Persons of ordinary skill in the art will understand that in the SMP mode (the Select_ASMP_CLK signal is unasserted), data from the processor (e.g., 210a) bypasses the asynchronous CDC circuit 131a on its way to the L2 cache (e.g., 220a), while data from the L2 cache (e.g., 220a) bypasses the asynchronous CDC circuit 131b on its way to the processor (e.g., 210a). In contrast, when in the ASMP mode (the Select_ASMP_CLK signal is asserted and the Cache_CLK and CPU_CLK signals may be different), data from the processor (210a) will be processed by the asynchronous CDC circuit 131a on its way to the L2 cache (220a), while data from the L2 cache (220a) will be processed by the asynchronous CDC circuit 131b on its way to the processor (210a). The asynchronous CDC circuits 131a, 131b function to ensure data transfer from one clock domain to another clock domain according to a predefined sequence, e.g., the data received first is output first. The incoming data that is synchronous with the clock in one clock domain will be re-synchronized with the clock in another clock domain. An asynchronous FIFO generally provides the data buffer at the interface with some latency.

When in synchronous mode, the Cache_CLK will generally be derived from the CPU_CLK (e.g., divide-by-1 or divide-by-3) from the CPU_CLK. In other words, they may be equal and the CPU_CLK is usually an integer multiple of the Cache_CLK (e.g., CPU_CLK=3*Cache_CLK). The two clocks are synchronous in nature. Data generally crosses the interface synchronously with much less latency.

The multiplexers 272a, 272b can be the same as the glitchless clock multiplexer 272 illustrated in FIG. 4. The demultiplexers 273a, 273b may be similar in nature or circuitry to the multiplexers, but performing a demultiplexing function. In one preferred embodiment, these also are glitchless (perform glitchless switching).

Figure 6:
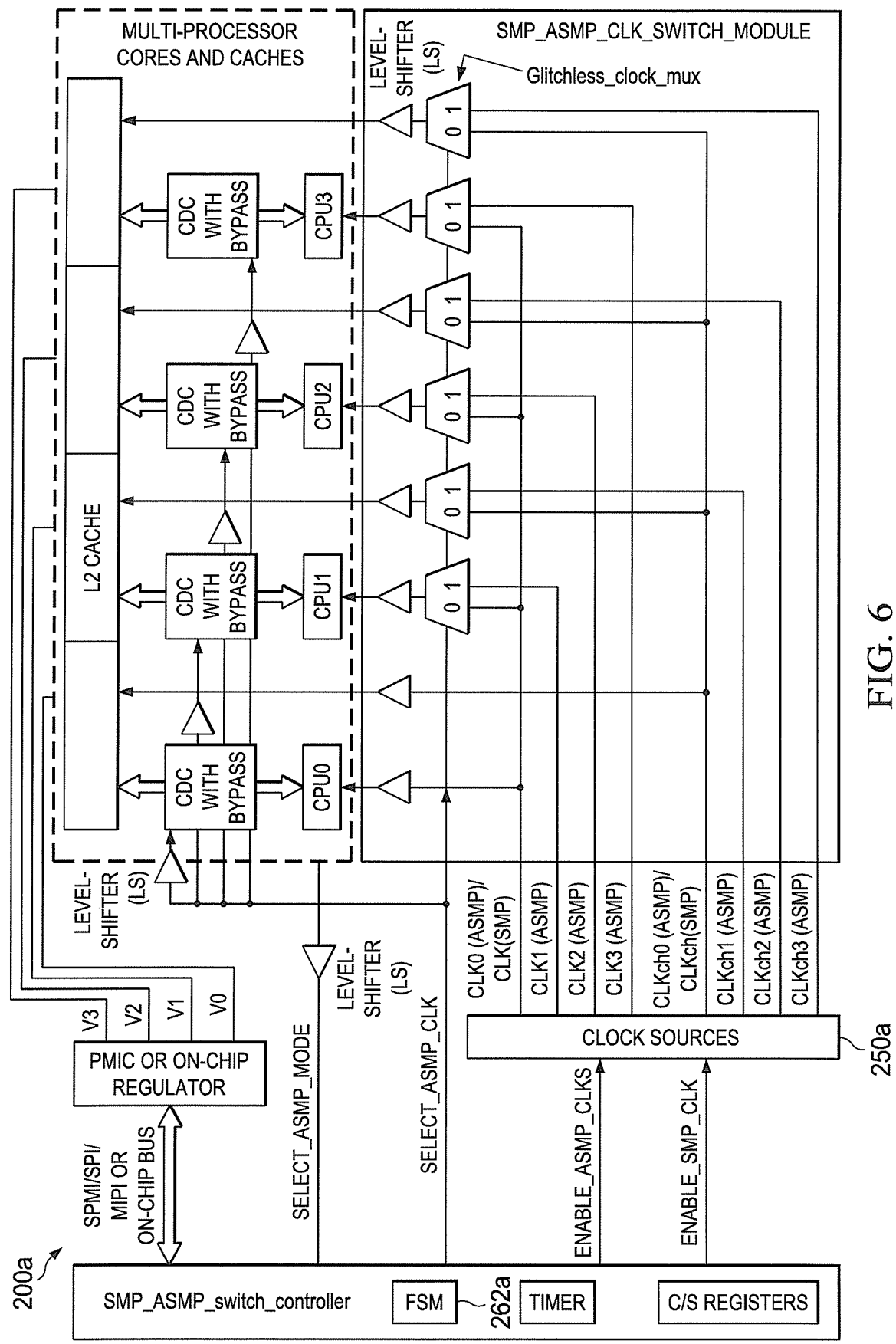
FIG. 6 is another embodiment of the example multiprocessing system shown in FIG. 2.

Now turning to FIG. 6, there is shown a detailed diagram illustrating another embodiment of a processing system 200a in accordance with the present disclosure. The processing system 200a is the same as the processing system 200 illustrated in FIG. 2, except (1) the CLK_0 signal functions as both the CLK_0 signal when in the ASMP mode and the CLK (SMP) signal when in the SMP mode, and (2) the CLK_ch0 signal functions as both the CLKch_0 signal when in the ASMP mode and the CLKch (SMP) signal when in the SMP mode. This eliminates the need for the first two multiplexers 272 associated with the processor/L2 cache pair (210a, 220a). In addition, a modified clock generation module 250a is provided to implement these clock signal differences, and a modified FSM 262a is also included.

Figure 6A:
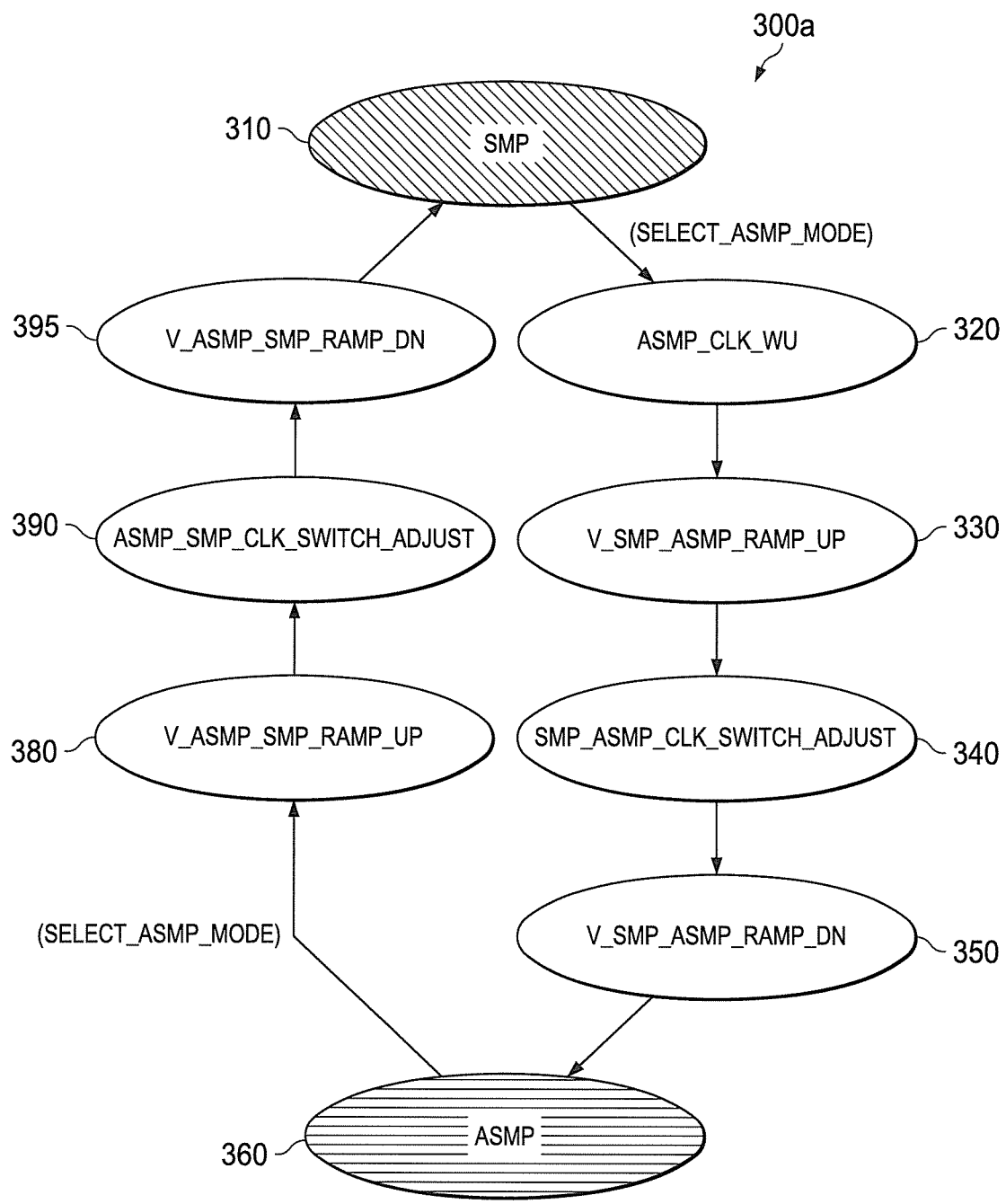
FIG. 6A illustrates another embodiment of a finite state machine (FSM) for use with the system shown in FIG. 6 according to the present disclosure.

As will be appreciated, the processing system 200a shown in FIG. 6 further includes a process or method 300a performed or implemented by the FSM 262a. As will be appreciated, the process/functionality of the FSM 262a is the same as the process/functionality of the FSM 262, except for the elimination of state 360 in the state machine. FIG. 6A illustrates the FSM 262a and when compared to the FSM 262 illustrated in FIG. 3A, it is readily understood that all the remaining states and transitions are essentially the same. As will be appreciated, the process or method flow of the FSM 262a is similar to the process or method flow of the FSM262 shown in FIGS. 3B and 3C, except for the modification as discussed. These similar process or flow diagrams have been omitted herein, for sake of brevity.

Figure 7:
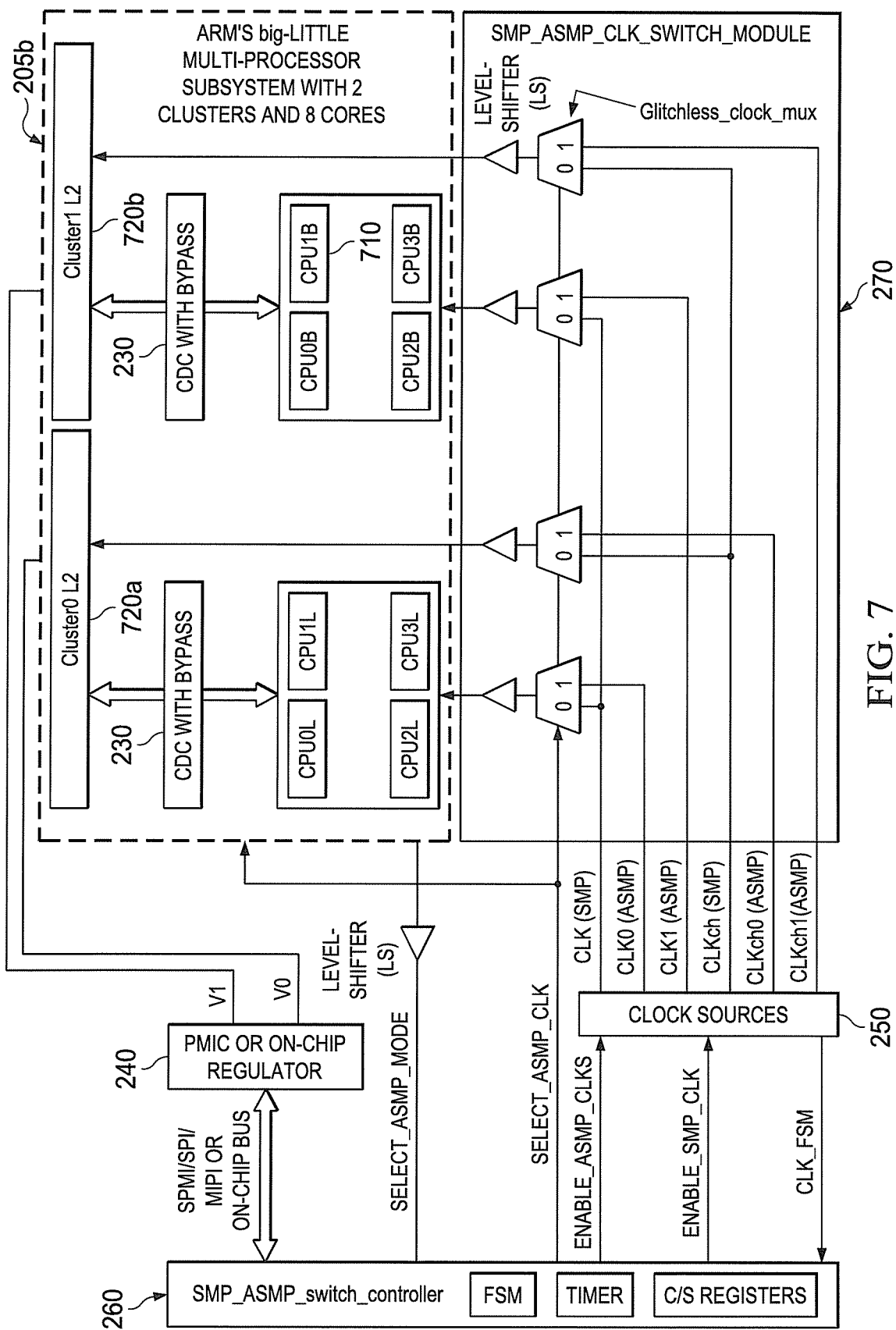
FIG. 7 is a diagram illustrating another embodiment of a multiprocessing system according to the present disclosure.

Now turning to FIG. 7, there is shown a detailed diagram illustrating a more specific embodiment of another processing system 200b in accordance with the present disclosure. The processing system 200b is the similar to the processing system 200 illustrated in FIG. 2, except the multi-processor cores and caches subsystem 205b includes a specific architecture. FIG. 7 illustrates an example application of the present disclosure teaching(s) incorporated into a specific architecture—ARM's Big-Little multi-processor subsystem that eight (8) processor cores 710 (a through h) and two (2) clusters of L2 cache 720 (a through b). Based on the two clusters of L2 cache, the system 200b requires only two stages of processor/L2 cache pairs. Further, various components shown therein, including 230, 240, 250, 260 and 270, may be the same as those shown in FIG. 2, and these may require some slight modification(s) when taking into consideration the specific architecture of the processors and cache subsystem 205b. These modifications would be readily understood by those of skill in the art. In addition, the concepts described in other embodiments, such as that shown in FIG. 6, may also be implemented in the system of FIG. 7.

In addition to the illustrative components, hardware and methods described above (with respect to FIGS. 1-8) for implementing switching between SMP and ASMP, the present disclosure further describe example methods and processes for initiating and controlling mode switching.

Dynamic mode switching between SMP and ASMP is introduced, which may be based on traffic type, processor wait time, load imbalance information and/or power consumption. As will be appreciated, other factors and types of information can be analyzed and form the basis of a decision to change (or maintain) modes. For example, SMP mode may be selected when load is light, or when load is heavy that all CPU cores are utilized and/or when L1 cache miss rate is high, while ASMP mode may be selected for heavy and/or unbalanced loads.

Static (i.e., manual) mode switching may also be implemented, such as based on processing types (e.g., computational intensive, time critical, etc.) or specific applications or application programs (e.g., the application program selects which mode to utilize).

Also described herein is a learning mechanism or process that may be utilized to facilitate intelligent mode selection in real time. For example, the learning system can determine whether SMP or ASMP mode would consume lower power for specific traffic or processing scenarios.

Figure 8:
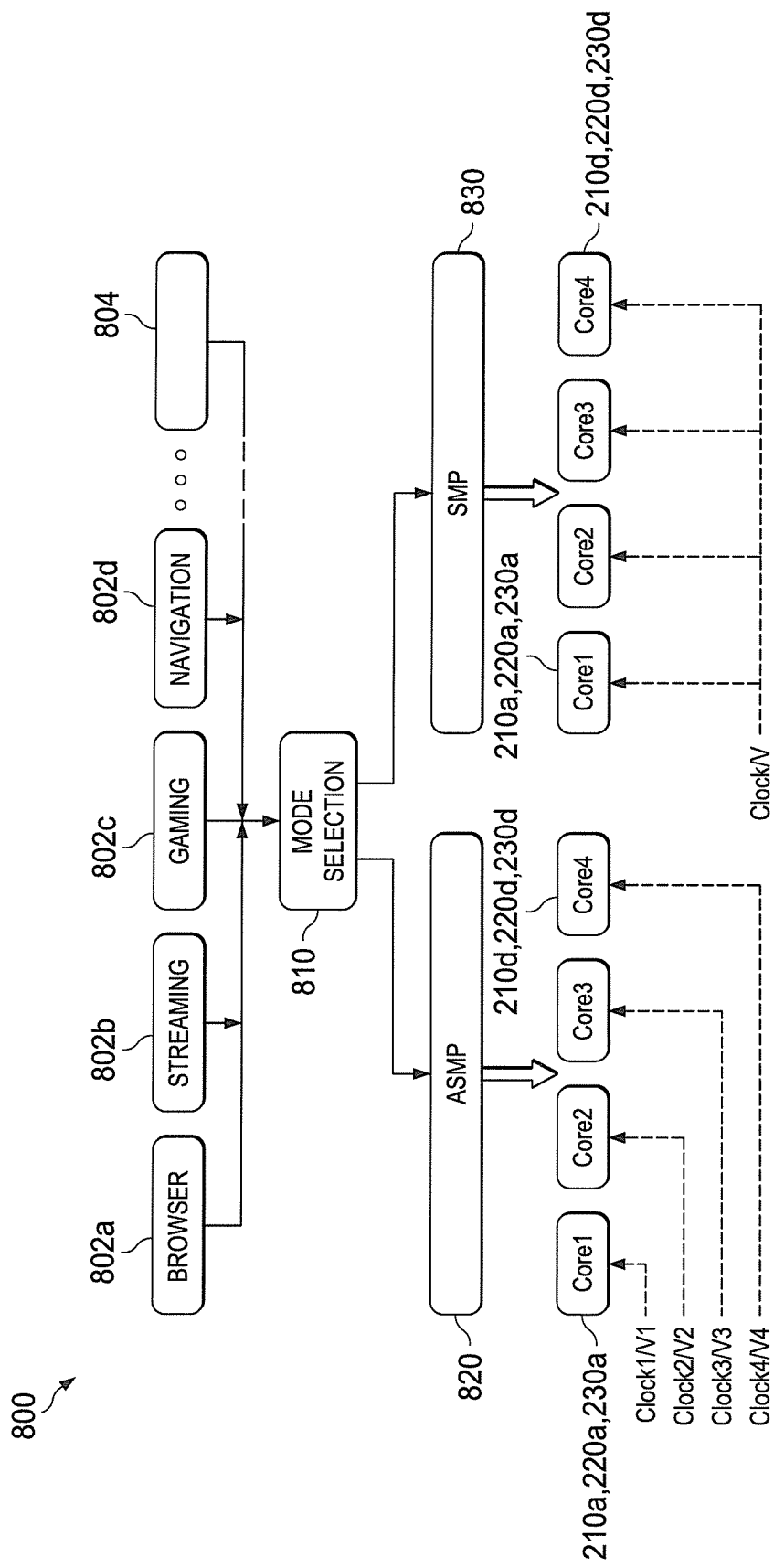
FIG. 8 is a diagram of an architecture (method, process, system) for initiating and controlling SMP/ASMP mode switching.

Turning now to FIG. 8, there is shown conceptually an architecture (e.g., method, process, system) 800 for initiating and controlling SMP/ASMP mode switching. Mode selection can be based on the type of processing or application desired, as well as other information or factors. As shown, the processing or application 802 may be a browser application 802a, a streaming application 802b, a gaming application 802c or a navigation 802d. Other factors/information 804 may also be considered.

As an example, assuming the streaming application 802b requires multi-processing, a mode selection device 810 determines whether processing tasks associated with that application should be performed in the SMP or ASMP mode. The system software/OS does this determination and makes the decision. The system may allocate a single processor to issue the command to the controller, but generally the decision is implemented at system-level/OS-level. This decision may be based on static information, dynamic information or a combination thereof. In one example, it could be predetermined that all video encoding applications will use SMP mode. In another example, all video streaming applications will use ASMP mode unless the current loading of the CPU is so heavy that all CPU cores are utilized. Other variations can be programmed and utilized to render the decision about whether to switch from one mode to the other.

In one embodiment, a look-up table may be consulted when single processing tasks are required. In another embodiment, comparison of power may be a factor used to select which mode when there are multiple processing tasks. For example, when a user is working on emails while listening to music simultaneously, ASMP can be selected.

After determining which mode should be selected, the device 810 issues the appropriate signal (e.g., high/low) on the SELECT_ASMP_MODE control signal (See, FIG. 2). As will be appreciated, the current mode of operation may already be the selected mode (and in such case the SELECT_ASMP_MODE signal will not transition).

Depending on the SELECT_ASMP_MODE signal, the system 200 will operate in the ASMP mode (820) or the SMP mode (830). When in the ASMP mode, the Core1 (elements 210a, 220a, 230a), the Core2 (elements 210b, 220b, 230b), the Core3 (elements 210c, 220c, 230c) and the Core4 (elements 210d, 220d, 230d) each operate with independent clock signals/frequencies and supply voltages. When in the SMP mode, the Core1 through Core4 operate with the same clock signal/frequency and supply voltage. The details of the SMP and ASMP modes (and mode switching) have been described more fully above.

Figure 9:
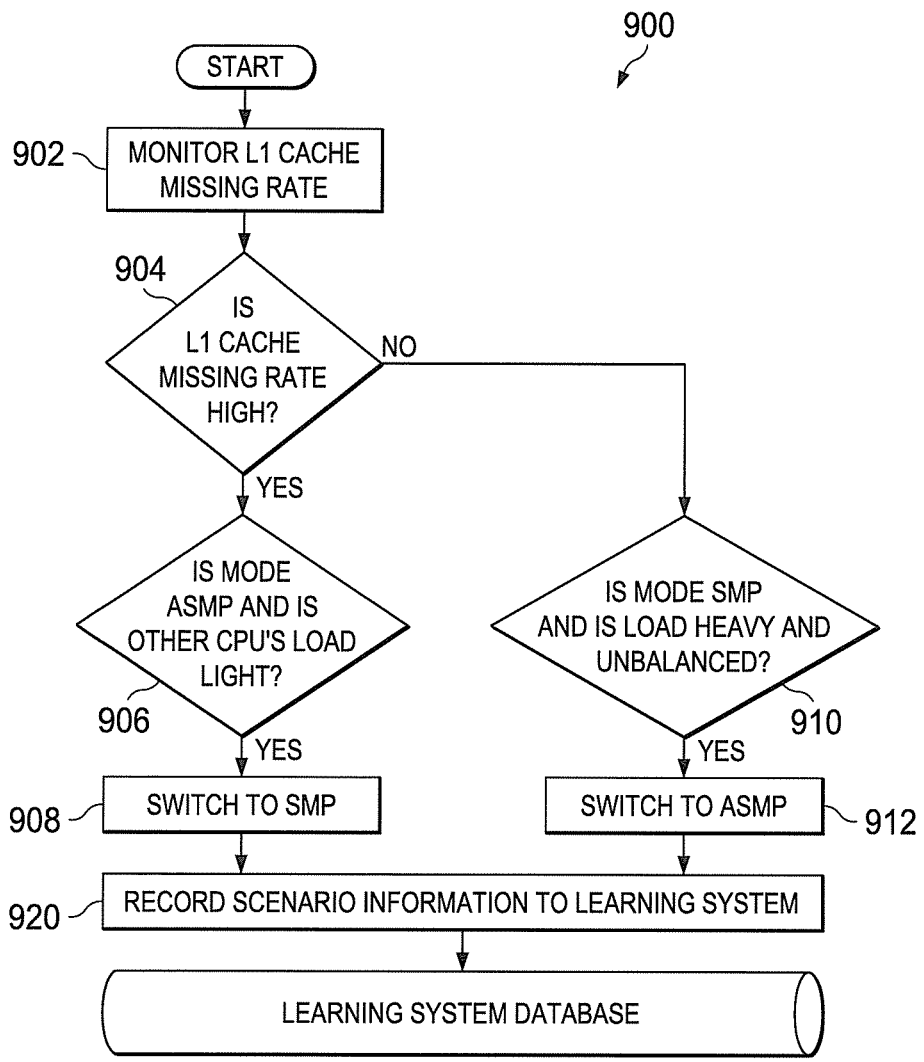
FIG. 9 illustrates an example dynamic mode switching method or process according to the present disclosure.

Now turning to FIG. 9, there is shown an example mode switching method or process 900 in accordance with the present disclosure. During operation of the system 200, L1 cache (specific to a processor core) miss rate is continuously monitored (step 902). The miss rate is compared to a predetermined threshold (step 904). If this miss rate is high (exceeds threshold), the process determines whether the current processing mode of the system 200 is ASMP and whether the other CPUs' loads are heavy/light (using another threshold) (step 906). If yes, the system 200 switches from ASMP mode to SMP mode (step 908). If no, the system 200 continues in ASMP mode.

If the L1 cache miss rate is not high, the process determines whether the current processing mode of the system 200 is SMP and whether the processing load is heavy and unbalanced (step 910). If yes, the system 200 switches from SMP mode to ASMP mode (step 912). If no, the system 200 continues in SMP mode.

The process 900 illustrated in FIG. 9 also includes an optional intelligent learning process. When the system 200 switches from ASMP mode to SMP mode (step 908) or from SMP mode to ASMP mode (step 912), the scenario information relevant to the determination to switch is recorded in a learning system database (step 920). The scenario information may be any part or all of the information utilized by the system to make the decision to switch modes. In the example shown, the scenario information may include L1 cache miss rate and load information (light/heavy, balanced/unbalanced).

Figure 10:
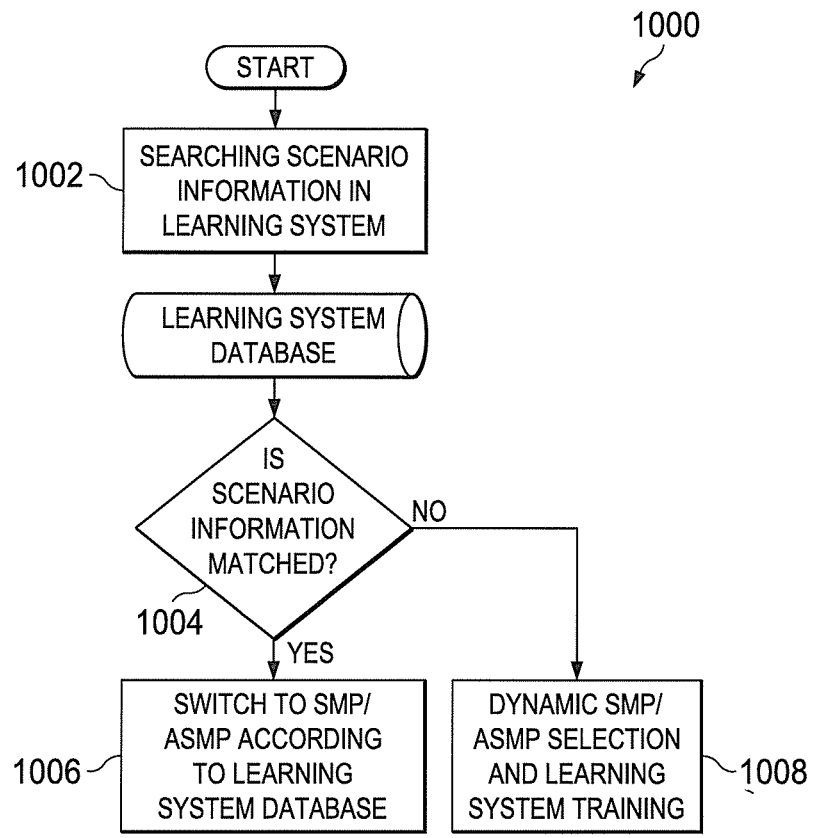
FIG. 10 illustrates an alternative mode switching method or process according to the present disclosure.

Now turning to FIG. 10, there is shown an example of an alternative mode switching method or process 100 based on historical data and intelligence from previous experiences. During operation, the system 200 periodically obtains dynamic system information (e.g., current scenario information) and searches the learning system database (step 1002). The current scenario information is compared to scenario information stored in the learning system database to determine whether there is a match (step 1004). If yes, the system 200 switches between ASMP mode and SMP mode in accordance with the information associated with the match scenario information (step 1006). As will be appreciated, this may result in a mode switch, but may also result in maintain current mode operation. If no, the system performs dynamic SMP/ASMP selection and learning system training—such as the process/method described in FIG. 9.

Figure 11:
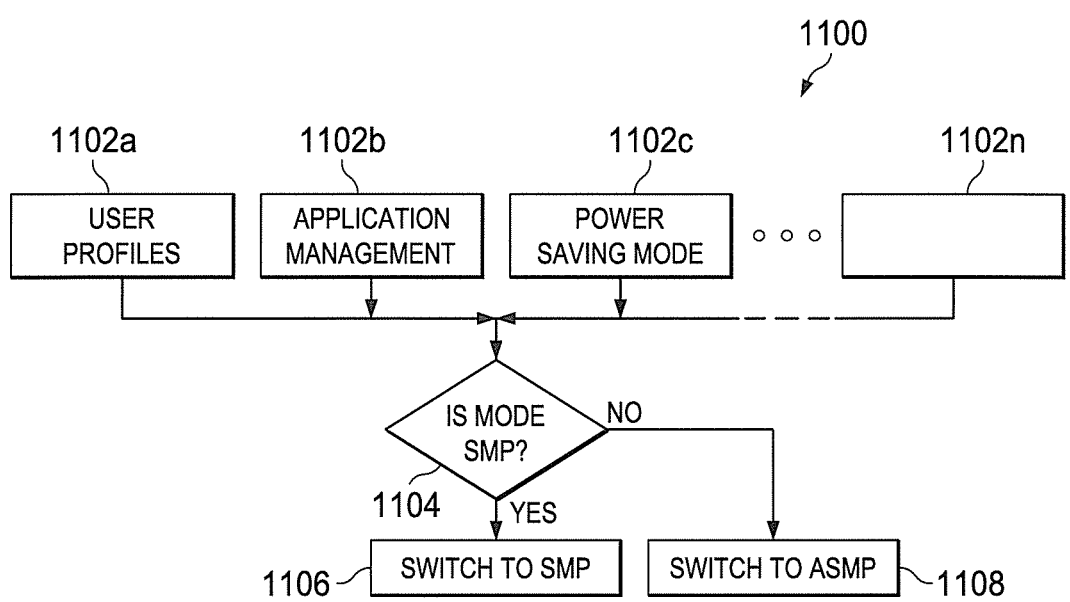
FIG. 11 illustrates an example static mode switching method or process according to the present disclosure.

FIG. 11 illustrates an example static mode switching method or process 1100 according to the present disclosure. In general terms, this process determines whether the system 200 should be operating in SMP or ASMP mode based on static or "manual" information or factors 1102. For example, the determination of which mode may be "statically" assigned based on a multitude of information or factors, e.g., user profiles 1102a, application management 1102b, power saving mode 1102c and other information or requirements 1102n.

The system 200 determines whether it should be operating in SMP mode or ASMP mode based on applicable information or input (1104). For example, if a given user profile is associated with a particular mode—meaning that processing associated with the given user should always be performed in the particular mode—then the system 200 will switch to the particular mode for processing if needed. In another example, if a particular application should always be performed in one mode, then the system 200 will perform processing for that application in the particular mode—and will switch if needed. In yet another example, if the system 200 is placed in power saving mode, that mode may require the system 200 to operation in either ASMP or SMP mode—whichever mode has been programmed to be the mode that will save power.

As shown, system 200 determines whether the processing task should be performed in the SMP mode (or ASMP mode). If SMP mode should be utilized—and the system is not currently in the SMP mode—the system switches from ASMP mode to SMP mode (step 1106). Similarly, if ASMP mode should be utilized (not SMP mode)—and the system is currently in the SMP mode—the system switches from SMP mode to ASMP mode (step 1108).

As will be appreciated, in one embodiment, the system, processes, methods and devices described herein may be utilized in a mobile environment, including incorporated within a mobile device/small computing device or a base station, and the like. Such devices may be, for example, configured to transmit and/or receive wireless signals. The devices may be any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, wearable electronic device or consumer electronics device.

The devices will include at least one processing system 200 (as described herein) which implements various processing operations of the device. This may include, for example, signal coding, data processing, video/audio processing, power control, input/output processing, or any other functionality contemplated for a device.

The processing system 200 also supports the methods and teachings described herein, and may include additional components and processor(s) (e.g., microcontroller, digital signal processor, field programmable gate array, or application specific integrated circuit).

The devices incorporating the processing system 200 may also include at least one transceiver configured to modulate data or other content for transmission by at least one antenna. The transceiver is also configured to demodulate data or other content received by the at least one antenna. Each transceiver includes any suitable structure for generating signals for wireless transmission and/or processing signals received wirelessly. Each antenna includes any suitable structure for transmitting and/or receiving wireless signals. One or multiple transceivers could be used in the device, and one or multiple antennas could be used.

These devices may also include one or more input/output devices to facilitate interaction with a user. Each input/output device includes any suitable structure for providing information to or receiving information from a user, such as a speaker, microphone, keypad, keyboard, display, or touch screen.

In addition, these devices may utilize memory described above, or may include other memory, for storing instructions and data used, generated, or collected by the device. For example, the memory could store software or firmware instructions executed by the processing system 200. The other memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Additional details regarding the mobile/small computing devices are known to those of skill in the art. As such, these details are omitted here for clarity.

FIGS. 12 through 19, discussed herein, and the various embodiments illustrated therein and principles described below of the present disclosure in this patent document are by way of illustration only and should not be construed in any way to limit the scope of the invention. Those skilled in the art will understand that the principles described herein may be implemented in any type of suitably arranged device(s) or system(s).

In general terms, the embodiments illustrated with respect to FIGS. 12-19 in the present application describe a processing system having multiple processors/cores that is switchable between two modes of operation: SMP and ASMP. The system includes a hardware apparatus that enables control and switching between the two modes. Within the hardware, upon receipt of a switching command from the operating system (OS) or other software/hardware, to switch between SMP and ASMP, a series or sequence of actions is performed to control clocks and voltages to the multiple processors and memory. The generation of the switching command can be based on one or more factors, as desired, such as loading, cache miss rate, power consumption reasons, etc. The apparatus ensures that the system does not fail during the transition from one mode to the other and clocks to the processors/memory are switched glitchlessly. The apparatus/method minimizes software/OS intervention and has faster mode-switch speed.

The embodiments described in FIGS. 12-19 are similar to those described in FIGS. 1-11, however, the ASMP mode generally refers to multi-processing using a group (multiple) of cores in which at least one core (or more, but less than all cores) capable of operating using the same clock frequency and same supply voltage as the other cores within the group is dynamically switched or configured to use a different clock frequency and supply voltage. In this way, the group of cores operates in either SMP mode or ASMP mode, but at least one (not all) in the group has a different clock frequency and supply voltage.

As will be appreciated, the term "core" used herein can refer to a single processor, CPU or processing core. The definition can also be extended to describe or refer to a "core" having multiple processors, CPUs or processing cores. Thus, the use of the term "core" herein is not limited to a single processing element, but can include a group of the same processing elements. In addition, the terms "core", "processor" and "CPU" can be, and are, used interchangeably herein.

In addition to dynamic switching between SMP and ASMP modes, these various embodiments that are described can be used in different methods and systems in which one or more cores are switched on/off within a group of cores.

Figure 12:
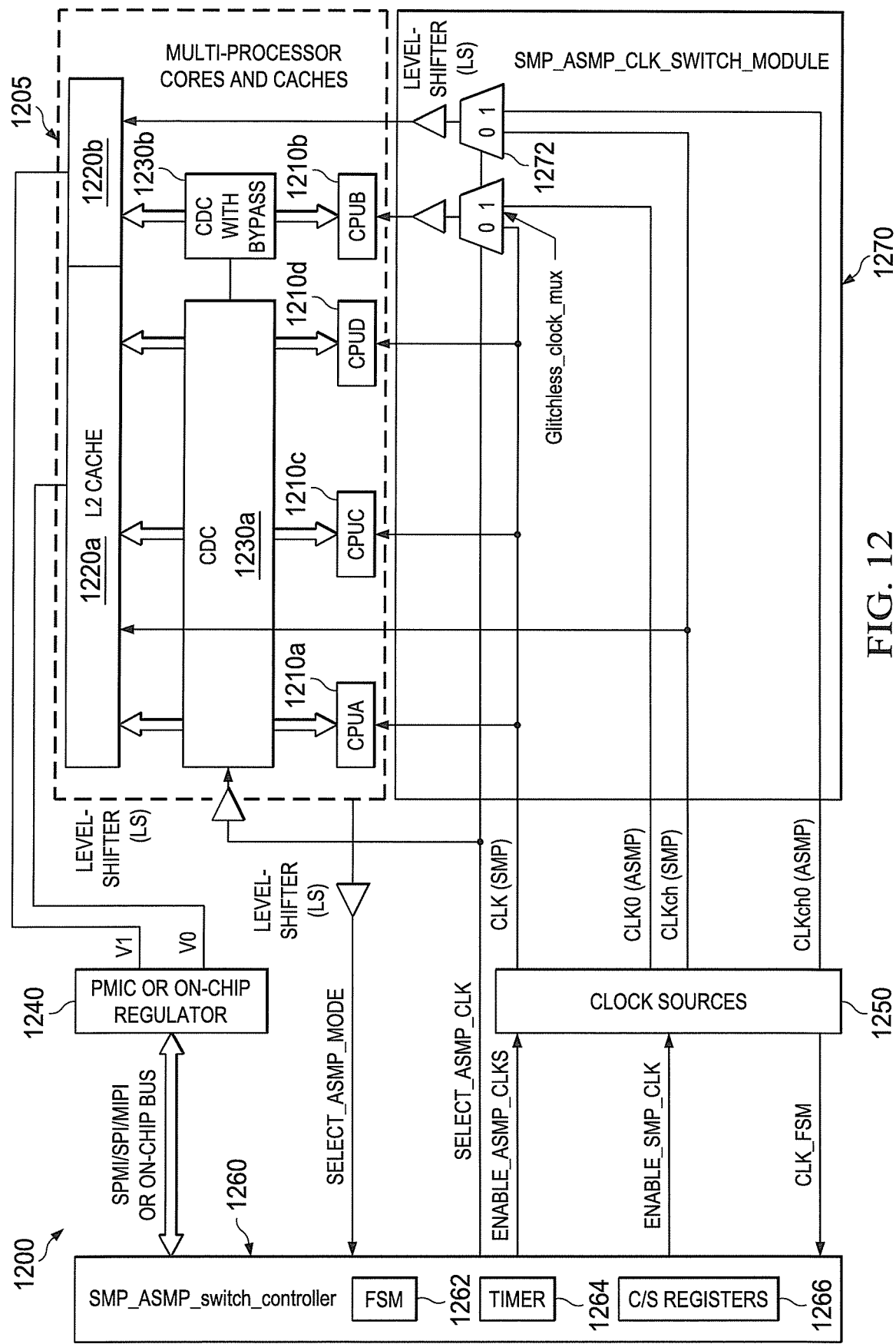
FIG. 12 is a diagram illustrating a second multiprocessing system according to certain embodiments of the present disclosure.

Now turning to FIG. 12, there is shown a detailed diagram illustrating a processing system 1200 in accordance with the present disclosure.

In general terms, the processing system 1200 includes a group (multiple) of processors switchable between two modes of operation: SMP and ASMP. In SMP mode, all of the processors operate using the same clock frequency and supply voltage, while in ASMP mode (in the different embodiments described below), at least one first processor is configured to operate using either (1) a clock frequency and a supply voltage different than those of the remaining processors, or (2) the same clock frequency and supply voltage as the other processors.

The system includes a hardware apparatus that enables control and switching of the first processor between two different clock frequencies and supply voltages. Within the hardware, upon receipt of a switching command from the operating system (OS) or other software/hardware, to switch between SMP and ASMP, a series or sequence of actions are performed to control a clock and voltage of the first processor and memory. The generation of the switching command can be based on one or more factors, as desired, such as loading, cache miss rate, power consumption reasons, etc. The apparatus ensures that the first processor does not fail during the transition from one mode to the other and clock(s) to the processors/memory are switched glitchlessly. The apparatus/method minimizes software/OS intervention and has faster mode-switch speed.

The processing system 1200 includes a multi-processor cores and caches subsystem 1205 having multiple processors 1210, which includes 1210a (CPU A), 1210c (CPU C), 1210d (CPU D) and 1210b (CPU B) with corresponding L2 cache memory portions 1220 (1220a and 1220b), a cross-domain clock (CDC) circuit 1230a, and a CDC with bypass circuit 1230b, as illustrated. While four processors 1210 (and corresponding memory and circuitry) are shown, the number of processors could be fewer or greater, but will include at least two. As will be appreciated, each processor 1210 may include one or more processors.

The processing system 1200 further includes a power management control (PMIC) circuit 1240 for generating at least two supply voltage signals (e.g., V0, V1) for use in supplying power to the processors, caches and CDCs. Similarly, a clock generation circuit 1250 generates multiple clock signals having various predetermined clock frequencies for use in clocking operation of the processors, caches and CDCs.

In one embodiment, with the exception of the PMIC circuit 1240, the processing system 1200 is disposed or otherwise located on a single integrated semiconductor substrate/die (or within multiple semiconductor substrates disposed within a multi-substrate IC package). In another embodiment, the PMIC circuit 1240 may also be included on the single integrated semiconductor substrate/dies.

As illustrated, the processing system 1200 also includes a controller 1260 (which may also be referred to as a mode controller) and a clock switching circuit (or module) 1270. As will be understood, the controller 1260 outputs various control signals for controlling the functionality and operation of the clock generation circuit 1250, the PMIC circuit 1240, the "CDC with bypass circuit" 1230b and the clock switching circuit 1270.

The clock generation circuit 1250 includes the necessary circuitry and elements for generating multiple clock signals, including one SMP processor clock signal (CLK) for controlling operational speed of all of the processors 210 collectively, one SMP memory clock signal (CLKch) for controlling operational speed of the cache portion 1220a, at least one ASMP processor clock signal (CLK0) enabling independent control of the operational speed of the processor 1210b, and at least one ASMP memory clock signal (CLKch0) enabling independent control of the operational speed of the cache memory portion 1220b. Any of these clocks are enabled or disabled glitchlessly by the circuit 1250. The clock generation circuit 1250 also generates a controller clock signal (CLK_FSM) for use by the controller 1260.

The PMIC circuit 1240 includes the necessary circuitry and elements for generating multiple operating supply voltages or signals for use by respective portions of the subsystem 1205. As illustrated, the PMIC circuit 1240 generates and outputs at least two operating supply voltages (V0, V1) that supply power to the processors. As shown, the operating supply voltage V0 supplies power to the processors 1210a, 1210c, 1210d and the cache memory portion 1220a associated with these processors. The operating supply voltage V1 supplies power to the processor 1210b, its associated cache memory portion 1220b, and the CDC with bypass circuit 1230b, etc. As understood by those skilled in the art, when a processor/memory operates at a higher clock speed, it is desirable and may be necessary to also operate the processor/memory with a higher supply voltage. In addition, when a core is not used, it can be power collapsed and/or clock-disabled. For example, the operating supply voltage V1 to the processor 1210b may be disabled and/or the clock input to the processor 1210b may be disabled (e.g., no input clock).

It will be understood that the clock generation circuit 1250 may also include functionality and circuitry enabling programmability to each of the generated clock signals. In one embodiment, each of the clock signals may be programmable to one of many possible frequencies (e.g., the CLK may be programmable between a range such as 300 Mhz to 3 GHz). In another embodiment, only certain clock signals may be programmable, while in other embodiments, the frequency of each clock signal is predetermined and fixed. In yet another embodiment, the frequencies may be fixed relative to each other, but may be programmable as a group.

Similarly, the PMIC circuit 1240 may also include functionality and circuitry to provide programmability to each of the generated operating voltage supplies V0, V1. In one embodiment, each supply may be programmable to one of many possible voltage levels (e.g., the voltage may be programmable between a range such as 0.5 volts and 3.3 volts). In another embodiment, only certain voltage power supplies may be programmable, while in other embodiments, the voltage level of each supply is predetermined and fixed. In yet another embodiment, the voltage levels may be fixed relative to each other, but may be programmable as a group. Though not shown, in another embodiment, a base operating voltage supply may be generated in addition to the two shown. In this case, the base voltage supply and the other one could be used as inputs to multiplexing circuitry (similar to the multiplexers 1272 shown in the clock switching circuit 1270).

The mode or switch controller 1260 includes a finite state machine (FSM) 1262, one or more timers 1264, and one or more storage registers 1266 (such as configuration or status registers). The controller 1260 functions to control and perform a sequence of actions or processes in response to assertion of a switch command (SELECT_ASMP_MODE). Therefore, in the illustrated embodiment, when the switch command is asserted/unasserted, the mode of operation is switched between the ASMP mode and the SMP mode. Various methods and mechanisms may be used for generation of the switch command, and some examples are described below with respect to FIGS. 13 and 16.

Using enable signals (ENABLE_ASMP_CLKS, ENABLE_SMP_CLK), the controller 1260 controls the clock generation module 1250 to enable the clocks prior to SMP/ASMP switching. The controller 1260 also controls the PMIC circuit 1240 module to program or change the operating supply voltages V0, V1 prior to switching (and after switching). In one embodiment, the controller 1260 may communicate with the PMIC circuit 1240 over a communication bus or interface, such as a SPMI/SBI/MIPI, if the PMIC circuit 1240 is external to the processors (e.g., off-chip). If the PMIC circuit is not external, other communication path(s) may be utilized.

The switch command (SELECT_ASMP_MODE) may be generated in response to various events and by various elements within or external to the processing system 1200. In the embodiment shown, the switch command is generated from the multi-processor cores and caches subsystem 1205, but in other embodiments it may be generated by other sources.

When actual switch over from the SMP clock to the ASMP clock (and vice versa) occurs for processor 1210b, the controller 1260 generates an ASMP select signal (SELECTASMP_CLK) that selectively multiplexes the ASMP clock signal (CLLO) to the processor 1210b using multiplexer 1272 within the clock switching circuit 1270. As understood, the clocks for the processor/CPU core 1210b in the ASMP mode is denoted CLK0, while the clock for the remaining processor/CPU cores 1210a, 1220c, 1210d in the SMP mode is denoted CLK. Thus, the SELECT_ASMP_CLK signal glitchlessly selects which clock (CLK0 or CLK) will be utilized by the processor 1210b. In one embodiment, when SELECT_ASMP_CLK is asserted (logic high or "1"), the clock signal CLK0 is selected and input to the processor/core 1210b. When SELECT_ASMP_CLK is unasserted (logic low or "0"), the clock CLK is selected and input to the processor/core 1210b. The timing of various events and actions during the switching is controlled by in accordance with the FSM 1262 with use of the one or more timers 1264. As will be described in more detail below, a clock warm-up period and a voltage ramp up/ramp down period can be utilized. These values can be pre-programmed or pre-set and stored in the C/S registers or other memory locations (none shown) in the controller by software or other methods.

Most of the elements illustrated in the processing system 1200 will be the same or similar as corresponding elements shown in the processing system 200 of FIG. 2 (e.g., 1210b same or similar to 210b, etc.). As will be appreciated, and though not specifically identified with reference numerals, various other logic circuits can be included, such as for example, level shifters. Level shifters are typically utilized when a signal crosses power domains.

With respect to the CDC circuit 1230b, it will be understood that in the SMP mode (the Select_ASMP_CLK signal is unasserted), data from the processor 1210b bypasses the asynchronous CDC circuit 131a on its way to the L2 cache 1220b, while data from the L2 cache 1220b bypasses the asynchronous CDC circuit 131b on its way to the processor 1210b. (See, FIG. 5 and accompanying description of the CDC circuit). In contrast, when in the ASMP mode (the Select_ASMP_CLK signal is asserted and the Cache_CLK and CPU_CLK signals may be different), data from the processor 1210b will be processed by the asynchronous CDC circuit 131a on its way to the L2 cache 1220b, while data from the L2 cache 1220b will be processed by the asynchronous CDC circuit 131b on its way to the processor 1210b. The asynchronous CDC circuits 131a, 131b function to ensure data transfer from one clock domain to another clock domain according to a predefined sequence, e.g., the data received first is output first. The incoming data that is synchronous with the clock in one clock domain will be re-synchronized with the clock in another clock domain. An asynchronous FIFO generally provides the data buffer at the interface with some latency.

Figure 13:
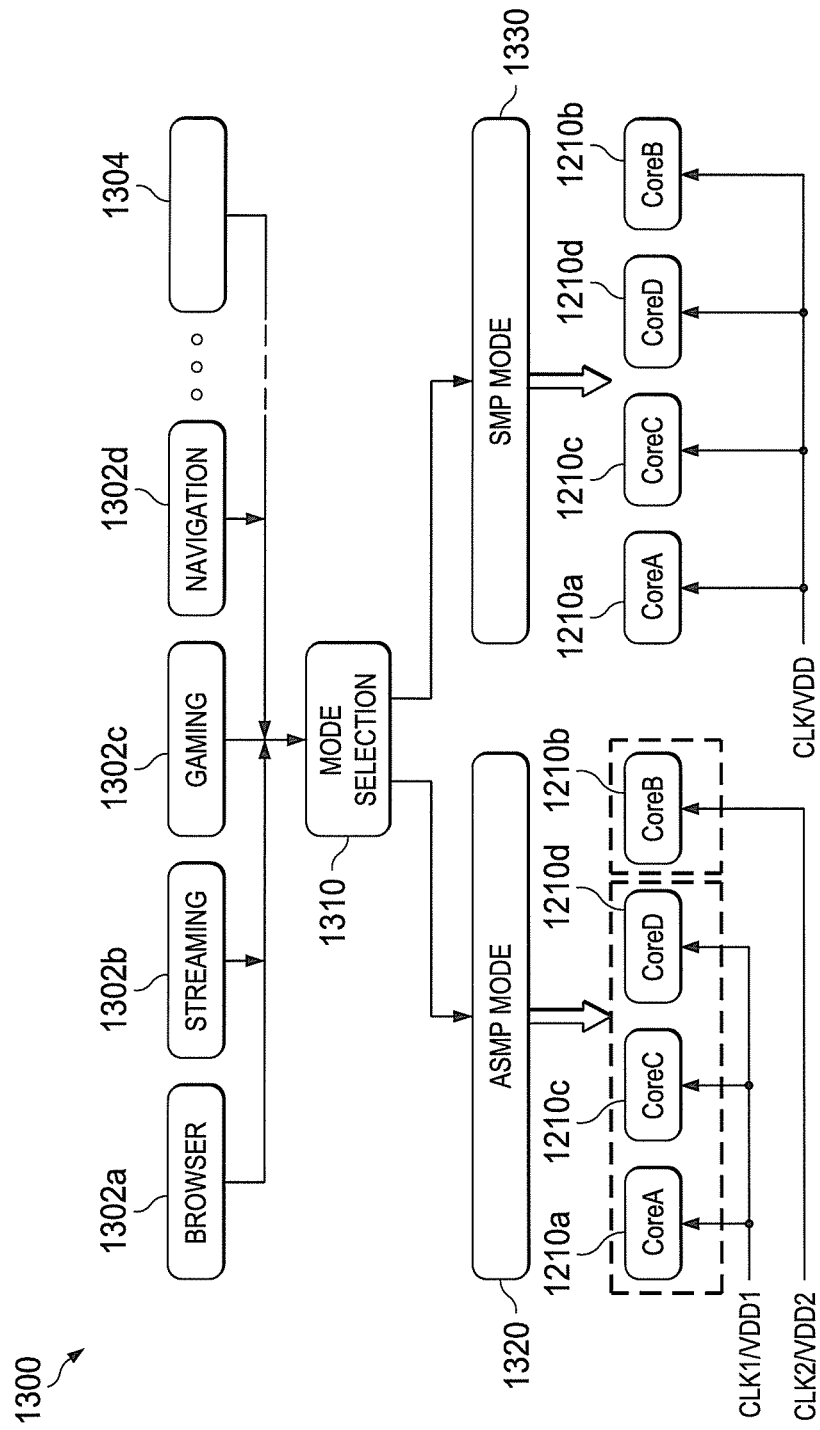
FIG. 13 is a diagram of an architecture (method, process, system) for initiating and controlling SMP/ASMP mode switching.

Turning now to FIG. 13, there is shown conceptually an architecture (e.g., method, process, system) 1300 for initiating and controlling SMP/ASMP mode switching within the system 1200. Mode selection can be based on the type of processing or application desired, as well as other information or factors. As shown, the processing or application 1302 may be a browser application 1302a, a streaming application 1302b, a gaming application 1302c or a navigation 1302d. Other factors/information 1304 may also be considered.

As an example, assuming the streaming application 1302b requires multi-processing, a mode selection device 1310 determines whether processing tasks associated with that application should be performed in the SMP or ASMP mode. The system software/OS performs this determination and makes the decision. The system may allocate a single processor to issue the command to a controller, but generally the decision is implemented at system-level/OS-level. This decision may be based on static information, dynamic information or a combination thereof. In one example, it could be predetermined that all video encoding applications will use SMP mode. In another example, all video streaming applications will use ASMP mode unless the current loading of the system is so heavy that all processors/CPUs/cores are utilized. Other variations can be programmed and utilized to render the decision about whether to switch from one mode to the other.

In one embodiment, a look-up table may be consulted when single processing tasks are required. In another embodiment, comparison of power may be a factor used to select which mode when there are multiple processing tasks. For example, when a user is working on emails while listening to music simultaneously, ASMP can be selected.

After determining which mode should be selected, the device 1310 issues the appropriate signal (e.g., high/low) on the SELECT_ASMP_MODE control signal (See, FIG. 12). As will be appreciated, the current mode of operation may already be the selected mode (and in such case the SELECT_ASMP_MODE signal will not transition).

Depending on the SELECT_ASMP_MODE signal, the system 1300 will operate in the ASMP mode (1320) or the SMP mode (1330). When in the SMP mode 1330, the Core A (elements 1210a, 1220a, 1230a), the Core C (elements 1210c, 1220a, 1230a), the Core D (elements 1210d, 1220a, 1230a), and the Core B (elements 1210b, 1220b, 1230b) operate with the same clock signal/frequency and supply voltage (CLK/VDD). When in the ASMP mode 1320, the Cores A, C and D operate with the same clock signal/frequency and supply voltage (CLK1/VDD1), while Core B operates with a clock signal/frequency and supply voltage (CLK2/VDD2) different than Cores A, C and D. The details of the SMP/ASMP modes (and mode switching) have been described herein.

It will be understood that the description and elements of the architecture (method or process) 1300 of FIG. 13 are the same/similar as corresponding elements shown in the architecture (method or process) 1300) of FIG. 8, but with the different clock and voltage configuration.

Figure 14A:
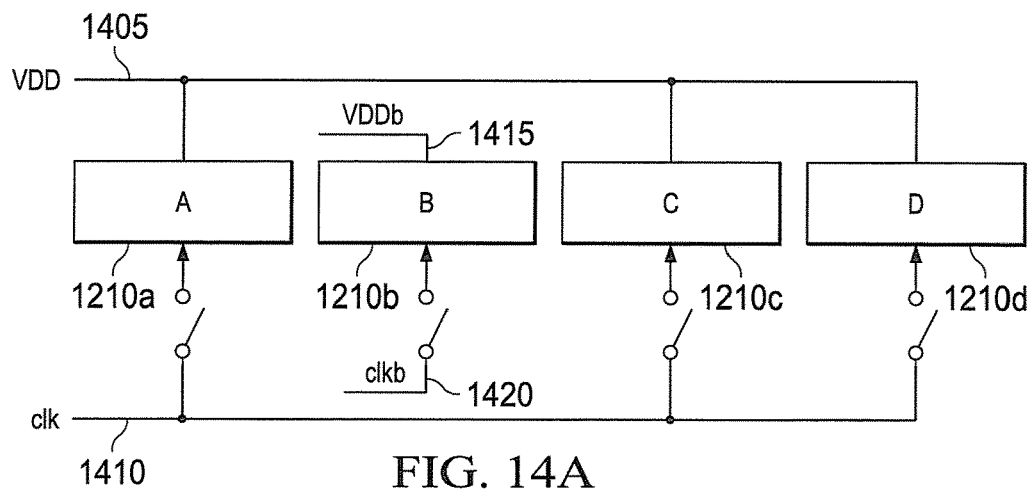
FIGS. 14A and 14B are simplified block diagrams illustrating two embodiments of the processing system shown in FIG. 12.
Figure 14B:
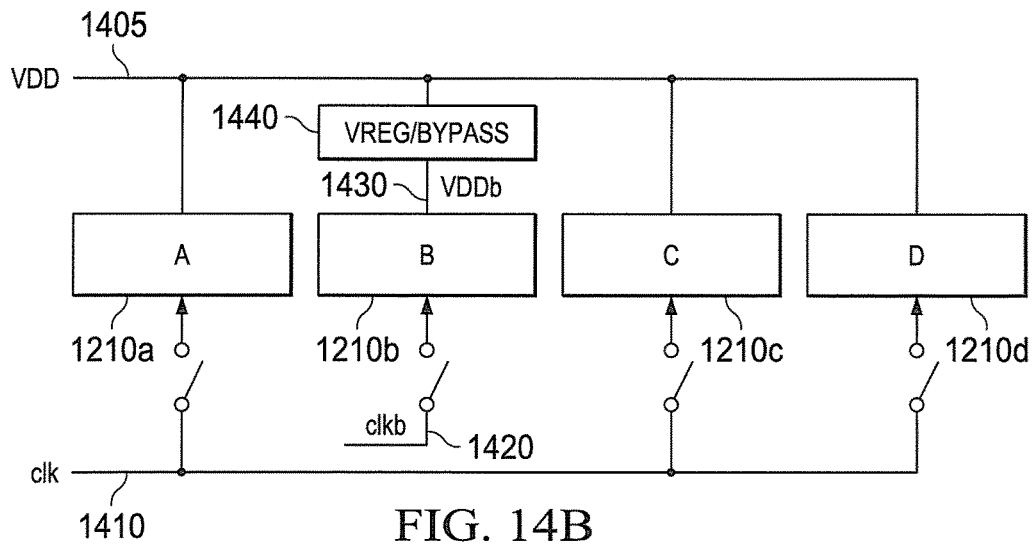

Now turning to FIGS. 14A and 14B, there are shown alternative and simplified block diagrams of the processing system 1200 shown in FIG. 12.

In FIG. 14A, the Cores A, C and D (1210a, 1210c, 1210d) are coupled to a single operating voltage supply 1405 (VDD) and to a single clock signal 1410 (clk), while Core B (1210b) is coupled to operating voltage supply 1415 (VDDb) and to a clock signal 1420 (clkb). In this configuration, the VDDb supply 1410 may be provided by a separate voltage rail supplied by a separate input/output terminal.

In FIG. 14B, the Cores A, C and D (1210a, 1210c, 1210d) are similarly coupled to a single operating voltage supply 1405 (VDD) and to a single clock signal 1410 (clk). The Core B is similarly coupled to operating voltage supply 1415 (VDDb) and to a clock signal 1420 (clkb). However, the Core B is coupled to operating voltage supply 1430 (VDDb) derived from the voltage supply 1405. A voltage regulator 1440 receives VDD and generates voltage supply VDDb and outputs either VDDb or VDD to the Core B (depending on mode selected). The voltage regulator 1440 can be on-chip, and includes a bypass mode or function (not shown), such as a low dropout (LDO) voltage regulator or a switch-mode power supply (SMPS). Thus, VDDb 1312 is derived from VDD. In the bypass mode, VDDb=VDD. In addition, VDDb can be power-collapsed by disabling the voltage regulator 1440 thereby shutting down the Core B. As will be appreciated, the bypass function for the voltage regulator can be implemented using a multiplexer and controlled by the state machine or other software process.

As will be appreciated, in one embodiment, the two voltage supplies VDD, VDDb and two clock signals clk, clkb are the two operating voltage supplies V0, V1 and the two clock signals CLK, CLK0, respectively, shown in FIG. 12.

In addition to the illustrative components, hardware and methods described above with respect to the system(s) of FIGS. 12-14 for implementing switching between SMP and ASMP modes, the example methods and processes described above with respect to FIGS. 8-11 for initiating and controlling mode switching between SMP and ASMP can be applied to these systems as well. A person of ordinary skill in the art will be able to readily modify those example methods and processes, if needed, to render them suitable and/or applicable to the systems described in FIGS. 12-14 (and those described hereafter).

Figure 15:
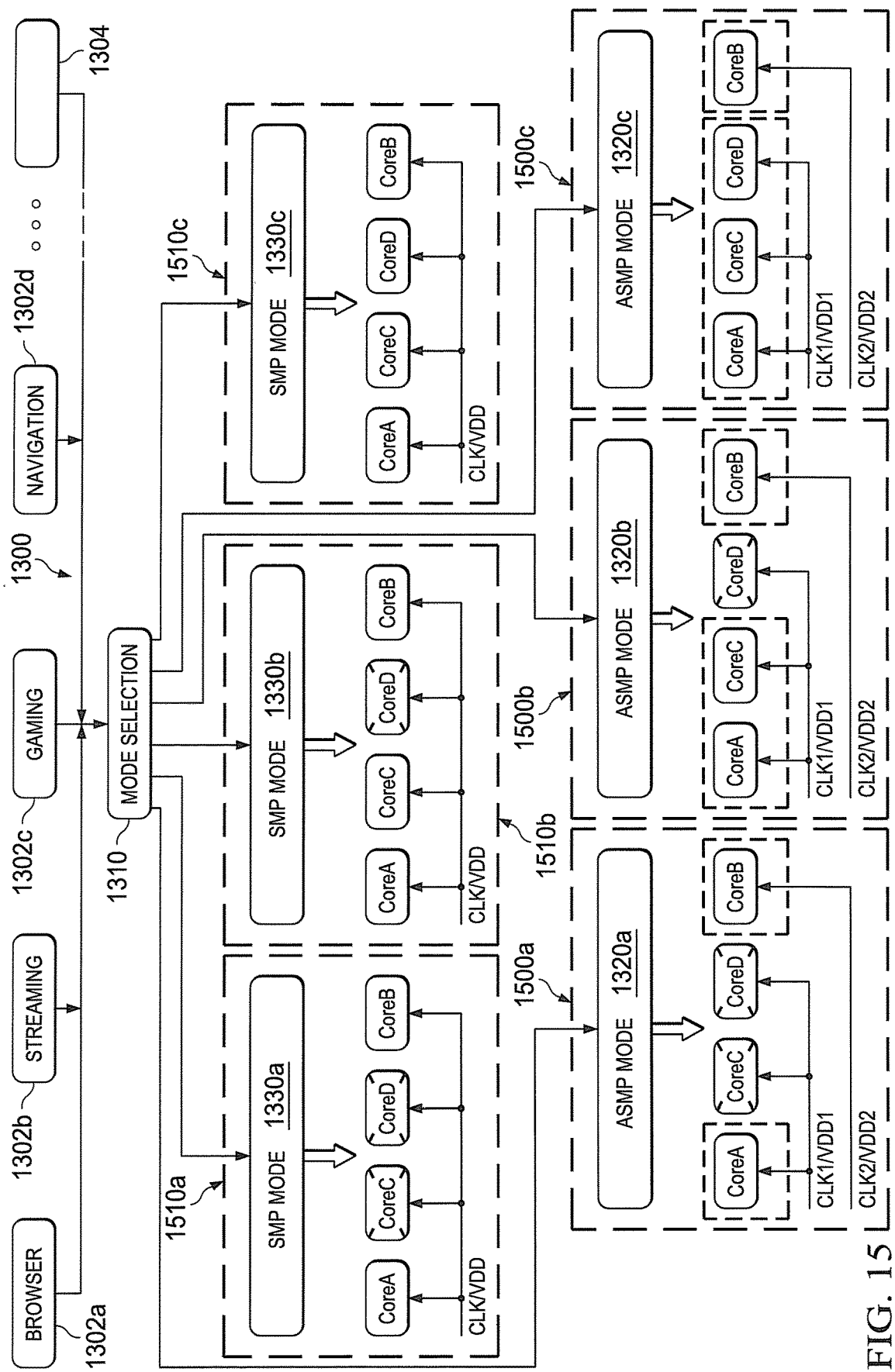
FIG. 15 illustrates different examples of multiprocessing configurations in a system having four processors/cores in SMP and ASMP modes.

Various examples of multiprocessing in a system having four (4) processors/cores (A, B, C, D) are described below in FIG. 15. These are for illustrative purposes only, and different implementations, methods and criteria may be utilized, including systems having more or less than 4 processors/cores (different numbers of processors/cores) and/or having one more processors/cores being idle (powered down, sleep mode, etc.). For example, when processing requirements are low, one or more select processors/cores can be shut down. In general terms, FIG. 15 illustrates examples in which a different number of processors/cores (Cores A, B, C and D) are utilized in either the ASMP mode 1320 or the SMP mode 1320. These Cores correspond to the Cores shown in the system of FIG. 12.

Blocks 1510*a*, 1510*b* and 1510*c* illustrate three different configurations of processors/cores operating in the SMP mode (1330*a*, 1330*b*, 1330*c*). Similarly, 1500*a*, 1500*b* and 1500*c* illustrate three different configurations of processors/cores operating in the ASMP mode (1320*a*, 1320*b*, 1320*c*).

Block 1510*a* illustrates the system operating in SMP mode with a first processor/core configuration in which Cores C and D are shut down and Cores A and B are running. In the SMP mode, Cores A and B operate at the same clock frequency and voltage supply (CLK/VDD) and Core B is configured to also receive CLK/VDD (e.g., CLK, CLKch, and V1 equals V0—see FIG. 12). Block 1500*a* illustrates this same processor/core configuration, but in ASMP mode. In ASMP mode, Cores A and B operate at different clock frequencies and voltage supplies—with Core A operating at CLK1/VDD1 and Core B operating at CLK2/VDD2 (e.g., CLK0, CLKch0, and V1 is different from V0—see FIG. 12).

Block 1510*b* illustrates the system operating in SMP mode with a second processor/core configuration in which Core D is shut down and Cores A, C and B are running. In the SMP mode, Cores A, C and B operate at the same clock frequency and voltage supply (CLK/VDD) and Core B is also configured to receive CLK/VDD (e.g., CLK, CLKch, and V1 equals V0—see FIG. 12). Block 1500*b* illustrates this same processor/core configuration, but in ASMP mode. In ASMP mode, Cores A and C operate at the same clock frequency and voltage supply CLK1/VDD1 and Core B operates at a different clock frequency and voltage supply CLK2/VDD2 (e.g., CLK0, CLKch0, and V1 is different from V0—see FIG. 12).

Block 1510*c* illustrates the system operating in SMP mode with a third processor/core configuration in which all Cores A, B, C and D are running. In the SMP mode, Cores A, C and D operate at the same clock frequency and voltage supply (CLK/VDD) and Core B is also configured to receive CLK/VDD (e.g., CLK, CLKch, and V1 equals V0 see FIG. 12). Block 1500*c* illustrates this same processor/core configuration, but in ASMP mode. In ASMP mode, Cores A, C and D operate at the same clock frequency and voltage supply CLK1/VDD1 and Core B operates at a different clock frequency and voltage supply CLK2/VDD2 (e.g., CLK0, CLKch0, and V1 is different from V0—see FIG. 12).

In one embodiment, when only two processors/cores are required, the system will utilize Core A (or Core C or Core D) and Core B to provide the flexibility for the group to switch between SMP and ASMP mode. When additional processing power is needed, then one or both of the remaining Cores can be utilized—again still providing flexibility for the group to switch between SMP and ASMP modes. As will be appreciated, switching between SMP mode and ASMP mode may occur in response to any of the above-described criteria or information. Also, the method/process implemented to switch between SMP and ASMP modes—in any of the embodiments described herein (and change CLKs and VDDs)—can be the same or similar as that described with respect to FIGS. 3A, 3B and 3C. While this may require some modifications or rearrangements, a person or ordinary skill in the art will be able to implement switching between the modes using FIGS. 3A, 3B and 3C as a guide.

The architecture of the system 1200 significantly reduces both costs and hardware/software complexity associated with SMP/ASMP dynamic switching as compared to the system 200. For example, in an MP system with four processors/cores, the added cost to a system configured in accordance with the system 1200 (in which only one processor is dynamically configurable) is on the order of one-third of the added cost compared to a system configured in accordance with the system 200 (in which all four processors are dynamically configurable).

Testing and investigation has revealed that in most cases, processing requirements can be met with two processors, and in most cases the two processors will be running with unbalanced loads. In the system 1200 operating with the two processor cores A and B (see, FIG. 12 and the configurations 1320*a* and 1330*a* illustrated in FIG. 15), appropriately switching between SMP and ASMP modes can optimize power efficiency. Similarly, for maximum performance, all four processor cores A, B, C and D can be operational in the SMP mode with maximum clock frequency and supply voltage—resulting in flexibility and power reduction while at the same time maintaining the same high end performance when needed. The system 1200 offers beneficial trade-offs between low-cost, low-power and high performance for mobile high level operating systems (HLOS) such as Android/iOS/Windows, and is also suitable for a low- to medium-tier market.

Persons of ordinary skill in the art will readily understand that one or more of the "cores" (e.g., A, B, C, D)—as illustrated in FIGS. 12-15 may each also include two or more processors within each core. In such embodiments, each "group" of processors is categorized to function as a distinct entity (or "core"). For example, Core A may include three processors while Core may include two processors. In the SMP mode, the five processors all operate at the same clock frequency and supply voltage. In ASMP mode, the processors in Core B are switched collectively to a different clock frequency and supply voltage. As will be appreciated, the decision(s) to switch between SMP and ASMP modes can be made based, or at least in part, based on a decision to active/deactivate a processor in the system. This is explained further below with respect to FIGS. 18-19.

Figure 16:
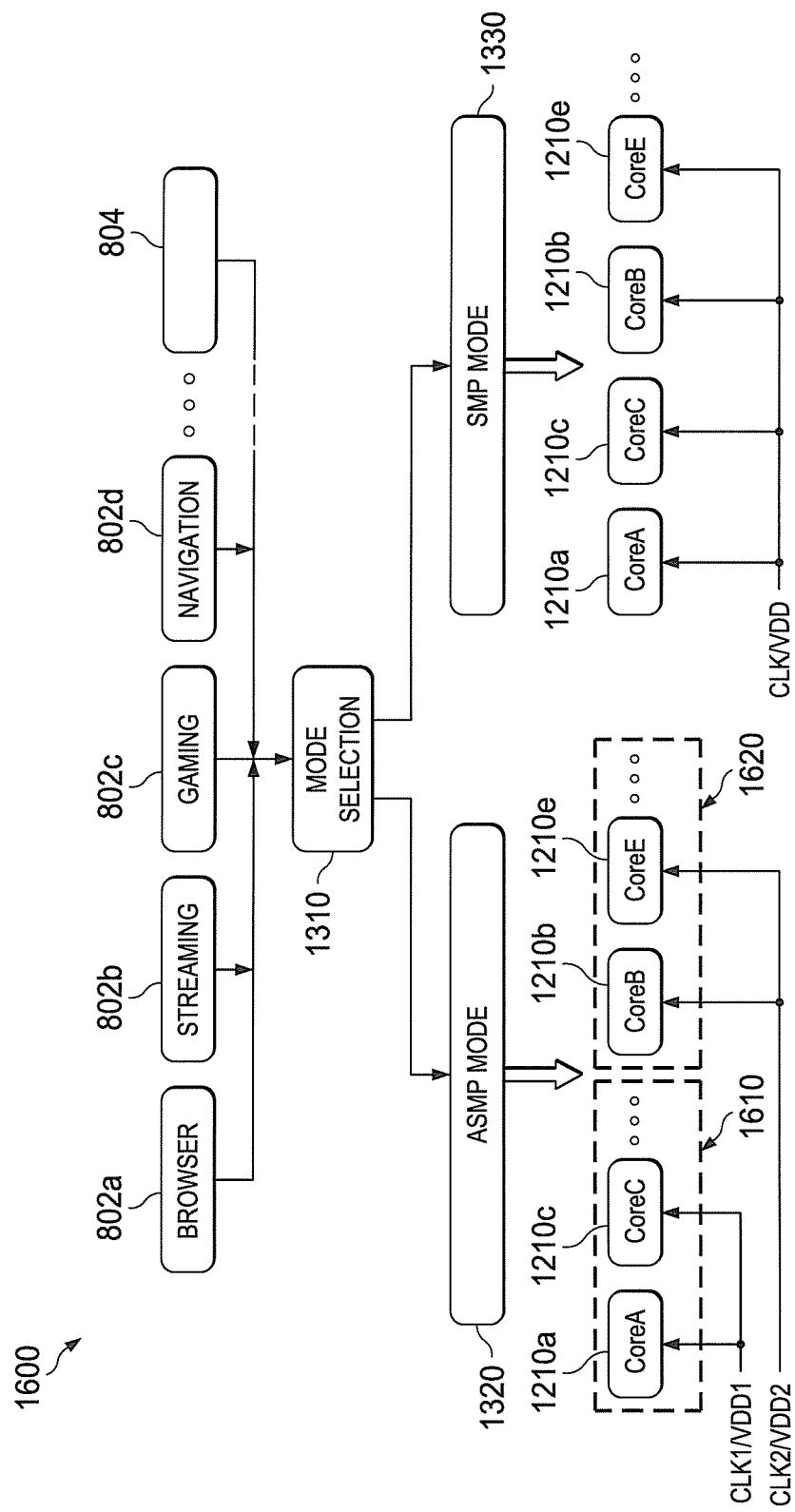
FIG. 16 is a diagram of an alternative architecture (method, process, system) for initiating and controlling SMP/ASMP mode switching.
Figure 18:
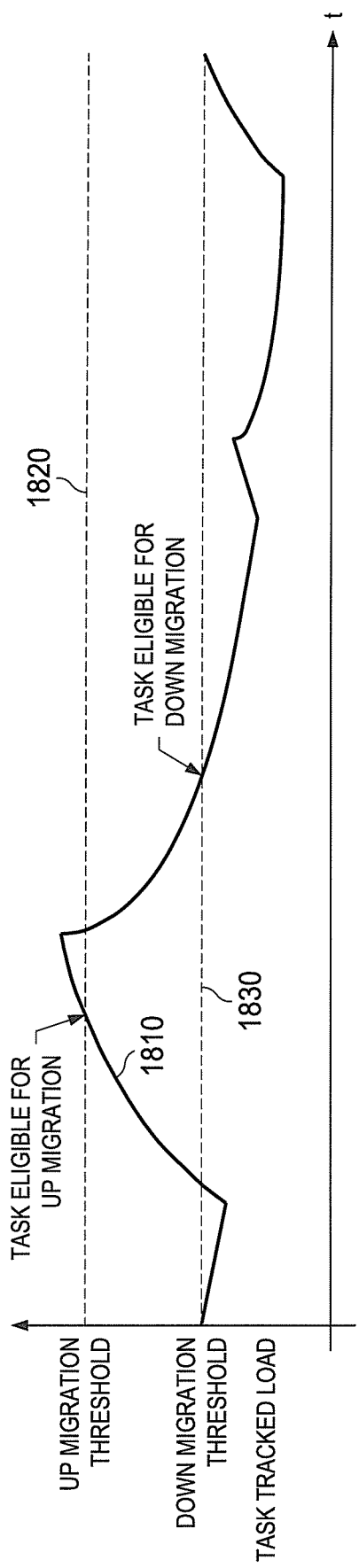
FIG. 18 is a graph illustrating when an additional processor should be activated (or when one of multiple active processors should be deactivated) based on task loading.

Turning now to FIG. 16, there is shown an alternative embodiment 1600 similar to the architecture (e.g., method, process, system) 1300 illustrated in FIG. 13. Similarly, mode selection can be based on the type of processing or application desired, as well as other information or factors.

The main difference between the systems 1600 and 1300 is that in system 1600, there are two or more processor/cores (Core B, Core E, etc.) that are dynamically configurable to operate at either the same clock frequency and voltage supply as all others (SMP mode) or at a clock frequency and voltage supply different from some of the others (ASMP mode). In other words, there are multiple processors/cores similar to Core B in the system 1300 of FIG. 13.

When in the ASMP mode, the entire group can be categorized as including two subgroups 1610 and 1620. In subgroup 1610, all of the processors/cores (e.g., Core A, Core C, etc.) within the subgroup only operate at a single clock frequency and voltage supply—meaning each will operate at one clock frequency and voltage supply (CLK1/VDD1). In subgroup 1620, each of the processors/cores (e.g., core B, Core E, etc.) within that subgroup operate at a clock frequency and voltage supply (e.g., CLK2/VDD2) different from CLK1/VDD1. Thus, the processors/cores within subgroup 1620 are dynamically selectable to operate at one multiple clock frequencies and voltage supplies (e.g., CLK1/VDD1, CLK2/VDD2, etc.) while the processors/cores within subgroup 1610 statically operate at a given clock frequency and voltage supply (CLK1/VDD2).

When in the SMP mode, all processors/cores operate at the same clock frequency and voltage supply (CLK/VDD). It will be understood that in practice, CLK/VDD is the same as CLK1/VDD1.

As with the system 1300, depending on the SELECT_ASMP_MODE signal, the system 1600 will operate in the ASMP mode (1320) or the SMP mode (1330). When in the SMP mode 1330, all of the Cores (e.g., A, B, C, E, etc.) operate with the same clock signal/frequency and supply voltage (CLK/VDD). When in the ASMP mode 1320, the Cores within subgroup 1610 (e.g., Cores A, C, etc.) operate with the same clock signal/frequency and supply voltage (CLK1/VDD1), while the Cores within subgroup 1620 (e.g., Cores B, E, etc.) operate with a clock signal/frequency and supply voltage (VCLK2/VDD2) different than the Cores in subgroup 1610. The details of the SMP/ASMP modes (and mode switching) have been described herein. Similarly, the decision(s) to switch between SMP and ASMP modes can be made based, or at least in part, based on a decision to active/deactivate a processor in the system. This is explained further below with respect to FIGS. 18-19.

It will be appreciated that although all the Cores within subgroup 1620 operate collectively at the same CLK2/VDD2, in another embodiment, those cores could be individually configurable to operate at multiple different clock frequencies and voltage supplies within the group (for example, the subgroup 1620 itself could have local SMP and ASMP modes also).

Figure 17:
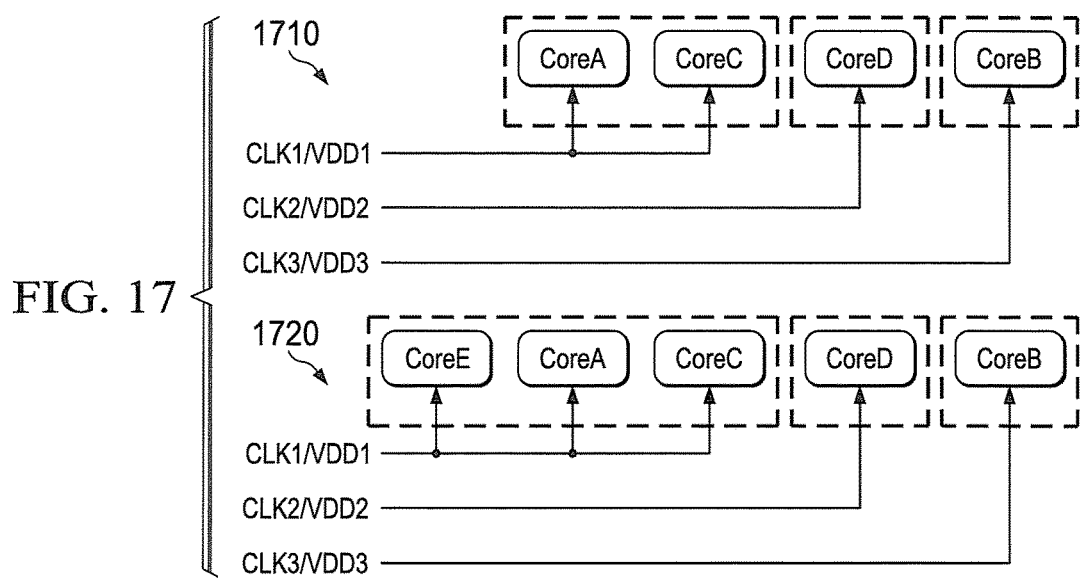
FIG. 17 illustrates alternative embodiments or architectures for the MP system.

Now turning to FIG. 17, there are shown two MP systems 1710 and 1720 illustrating other embodiments or architectures. The systems include n number of cores which are individually configurable (dynamically switchable) to operate at multiple different frequencies, where n is 2 or more.

The system 1710 includes Cores A and C operating at a first fixed clock frequency/voltage supply CLK1/VDD1. Core D operates at a second clock frequency/voltage supply CLK2/VDD2, while Core B operates at a third clock frequency/voltage supply CLK3/VDD3. In accordance with the teachings herein, when the system is in the SMP mode, all clock frequencies and voltage supplies equal when the system is in the SMP mode, all clock frequencies and voltage supplies equal CLK1/VDD1. When in ASMP mode, the clock frequency/voltage pairs CLK1/VDD1, CLK2/VDD2 and CLK3/VDD3 are not equal. The system 1720 is similar to the system 1710 but illustrates a Core E also configured to operate at the first fixed CLK1/VDD1. Thus, the systems 1710, 1720 include a first group of processors (operating at a fixed CLK1/VDD1) and a second group of processors in which each individual processor is dynamically switchable to operate at either the fixed CLK1/VDD1 (in SMP mode) or at a different clock frequency/voltage supply (e.g., CLK2/VDD2, CLK3/VDD3).

As will be appreciated, any number n of individually dynamically switchable (CLK/VDD) cores may be included in the system 1710, 1720 and/or any number of fixed (CLK1/VDD1) cores may be included. Though not shown specifically, the dynamic switching functionality for the systems 1710, 1720 may be implemented in a similar manner as set forth in FIG. 12 (with necessary modifications know to those skill in the art), and may also be implemented in other manners as described in this document.

Various operational examples or methods with respect to the system 1200 illustrated and described in the FIGURES are now described below.

In a first general operational scheme, when one or three or more cores are active, the SMP mode is selected and all active processors operate at the same clock frequency and voltage supply. When two cores are active, one of the active processors is Core B and the other active processor is either Core A, Core C or Core D, and the two active processors can be switched between SMP mode and ASMP mode when desired (based on the processes and methods described in accordance with FIGS. 9-11 and/or in accordance with other FIGURES or descriptions herein).

In a second general operational scheme, when two cores are active (one active core is Core B), the two active cores are configured to operate in ASMP mode. When three or more cores are active, the active cores are configured to operate in SMP mode.

In a third operational scheme, when two cores are active (one active core is Core B), the two active cores are initially configured to operate in ASMP mode. With two active cores in ASMP mode, the cores can be switched between SMP and ASMP modes (based on the processes and methods described in accordance with FIGS. 9-11 and/or in accordance with other FIGURES or descriptions herein).

Another concept introduced and described herein is directed to loading and utilization of the processors/cores. In multiple processors/cores systems, not all processors/cores are needed at all times. When processing requirements are low only one or a few processors may be needed, and when high more processors may be needed. This concept can be introduced or integrated into the mode selection process, or the mode selection process can be based, at least in part, on how many processors are required to handle computing requirements.

In the systems described herein, additional functionality (not specifically shown) can be provided that enables each core to be clock-disabled and/or power-collapsed to place the processor/core in a sleep mode, disabled or shutdown. This results in a reduction in power consumption by turning off processors that are not needed (when a smaller number of processors can handle the processing requirements).

Various processes or methods can be implemented to determine how many processors are needed to meet current computing requirements. Once this determination is made, then the cores can be switched on/off in any suitable sequence and/or priority, such as described in the paragraphs below.

Based on various computing factors and requirements (e.g., loading, queue length, tasks, threads, dependencies, CPU requests, and the like, etc.), a processor can be turned on/off when desired. In one embodiment illustrated in FIG. 18, the determination of when an additional processor should be activated (or when one of multiple active processors should be deactivated) is based on task loading. As task load 1810 increases, a point is reached (up migration threshold 1820) at which it is desirable to activate an additional processor to handle the increased load. When the up migration threshold 1820 is reached, another processor is brought online. With two active processors, the task load 1810 begins to decrease. When a point is reached (down migration threshold 1830) at which it is desirable to deactivate one of the active processors because the current load can be handled by one processor. As illustrated, the two thresholds 1820, 1830 are set to provide a hysteresis function.

The description that follows illustrates this concept as applied to the system 1200 (with the specific Cores A, B, C and D as illustrated in FIG. 12). When processing requirements can be met by a single core, one of either Core A, C or D is utilized, and the other cores are shut down. When processing requirements need two cores, Core B is utilized and either one of Cores A, C or D is utilized, and the other two cores are shut down. However, it will be appreciated that whichever single core is active when it is determined that two cores are needed, should probably remain as one of the active cores. When the two cores are active (one is Core B), various criteria described herein, such as cache miss or learning system, is utilized to determine whether to switch between SMP and ASMP mode (e.g., to lower power).

When processing requirements need three cores, core B is utilized and two of Cores A, C and D are utilized. When the three cores are active (one is Core B), various criteria described herein, such as cache miss or learning system, can be utilized to determine whether to switch between SMP and ASMP mode (e.g., to lower power). Similarly, in the case that computing requirements need all four cores, switching between SMP and ASMP modes can be implemented if desired.

Figure 19:
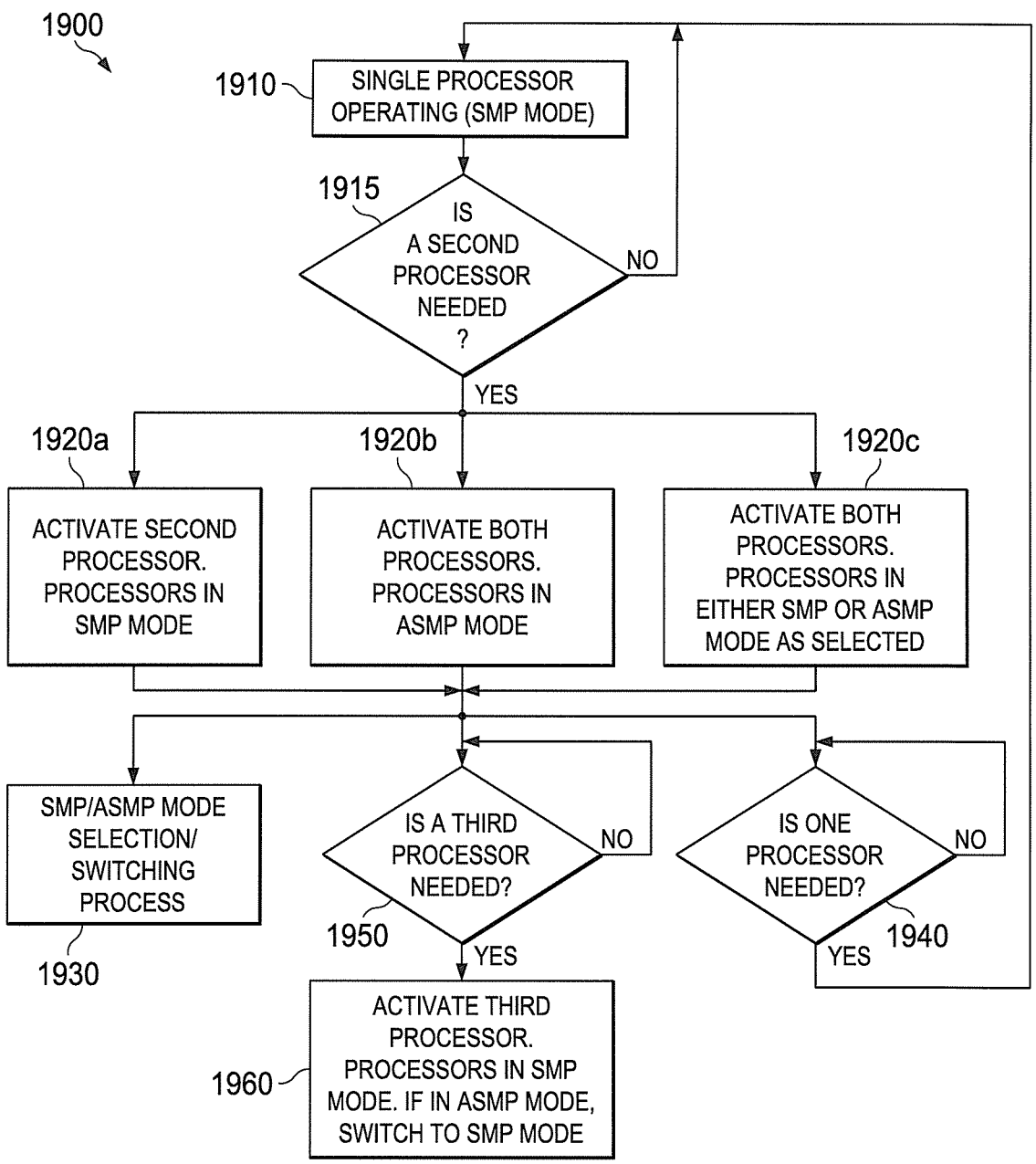
FIG. 19 is a general flow diagram of a process for adding/removing processors integrated with a SMP/ASMP mode selection/switching process.

Now turning to FIG. 19, there is illustrated a general flow diagram of a process 1900 for adding/removing processors that is integrated with a SMP/ASMP mode selection(s) process(es). Various rearrangements or modifications may be made to the illustrated process depending on the specific architecture utilized (e.g., number of cores) and the desired functionality or application. As will be appreciated, not all steps or elements that may be utilized in such a process are shown.

The process 1900 is shown at a point in which a single processor is operating. When only a single processor is needed, the MP system operates in the SMP mode at a single fixed CLK1/VDD1 (step 1910). At some point during processing operations, it is determined whether a second processor is needed to handle an increase in processing requirements (or for some other reason) (step 1915). This determination can be made on a periodic basis or in response to operating information.

In response to the determination that another processor is needed, the process 1900 proceeds along one of three possible paths 1920a, 1920a, 1920c—as desired by the designer. These three alternatives relate to whether, upon activation of the second processor, the two active processors will default to: (1) SMP mode (1920a), (2) ASMP mode (1920b), or (3) function in accordance with the operating system requirements or process mode selection information and determine that either the SMP mode or ASMP mode should be selected (1920c).

If default SMP mode (1920a) is selected, then the second processor is automatically configured to receive and operate in accordance with CLK1/VDD1 (while the first processor also operates with CLK1/VDD1). In contrast, if default ASMP mode (1920b) is selected, then the second processor is automatically configured to receive and operate in accordance with CLK2/VDD2 different from CLK1/VDD1 (while the first processor operates with CLK1/VDD1). If the third default process is selected (1920c), the system will perform an "initial" SMP/ASMP mode selection/switching process (not shown) to determine whether to activate the second processor such that the two processors are begin operating in SMP mode or ASMP mode.

Once both processors are active and either (1) operating in the default SMP mode, (2) operating in the default ASMP mode, or (3) operating in a selected mode—either SMP or ASMP, the process continues to an SMP/ASMP mode selection/switching process (step 1930). In this process, the MP system determines from various operating parameters (as described in length herein above), whether to dynamically switch between SMP/ASMP modes.

Meanwhile, the system continues to assess the need for more or less computing processing power, etc., and may make a determination whether the processing requirements are at a level such that one of the two active processors can be rendered inactive (step 1940). If no, then the process continues implementing the selection/switching process 1930. If yes, the process proceeds back to utilization of a single processor (in SMP mode) (step 1910). The process may also make a determination whether the processing requirements are at a level such that a third processor is needed (step 1950). If no, then the process continues implementing the selection/switching process 1930. If yes, the process proceeds and activates the third processor (step 1960). If the two processors currently active are in ASMP mode, then they are switched to SMP mode and all three operate in SMP mode.

In another embodiment (with additional reference to FIGS. 15 and 16), switching between SMP/ASMP mode while also turning on/off one of the processors can be performed in either a one-step or two-step process. For example, assume the system is operating in accordance with the configuration shown by 1500a in FIG. 15 (i.e., ASMP mode with 2 cores). As load increases and the operating system determined that a 3rd processor is necessary, the system can switch directly from the 1500a configuration to the 1510b configuration (i.e., 3 cores in SMP mode). This is one-step switching, which is faster than two-step switching. In two-step switching, the two active processors would first be switched to SMP mode (first step), and then the 3rd processor would be activated. This is illustrated by the transition from 1500a to 1510a, and then from 1510a to 1510b. As will be appreciated, either one-step or two-step switching may be implemented when mode switching occurs at least in response to activating/deactivating processors.

Similar to the systems, processes, methods and devices described in FIGS. 2-11 (and the accompanying text), the systems, processes, methods and devices described in FIGS. 12-17 may be utilized in a mobile environment, including incorporated within a mobile device/small computing device or a base station, and the like. Such devices may be, for example, configured to transmit and/or receive wireless signals. The devices may be any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, wearable electronic device or consumer electronics device.

The devices will include at least one processing system 1200 (as described herein) which implements various processing operations of the device. This may include, for example, signal coding, data processing, video/audio processing, power control, input/output processing, or any other functionality contemplated for a device.

The processing system 1200 also supports the methods and teachings described herein, and may include additional components and processor(s) (e.g., microcontroller, digital signal processor, field programmable gate array, or application specific integrated circuit).

The devices incorporating the processing system 1200 may also include at least one transceiver configured to modulate data or other content for transmission by at least one antenna. The transceiver is also configured to demodulate data or other content received by the at least one antenna. Each transceiver includes any suitable structure for generating signals for wireless transmission and/or processing signals received wirelessly. Each antenna includes any suitable structure for transmitting and/or receiving wireless signals. One or multiple transceivers could be used in the device, and one or multiple antennas could be used.

These devices may also include one or more input/output devices to facilitate interaction with a user. Each input/output device includes any suitable structure for providing information to or receiving information from a user, such as a speaker, microphone, keypad, keyboard, display, or touch screen.

In addition, these devices may utilize memory described above, or may include other memory, for storing instructions and data used, generated, or collected by the device. For example, the memory could store software or firmware instructions executed by the processing system 1200. The other memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Additional details regarding the mobile/small computing devices are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of non-volatile medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multi-processor (MP) processing system, comprising:
   a plurality of processors comprising:
      a first processor configured to receive and operate in accordance with a first clock signal having a first predetermined frequency and a first supply voltage having a first predetermined operating voltage; and
      a second processor configured to receive and operate in accordance with either the first clock signal or a second clock signal having a second predetermined frequency different from the first predetermined frequency and receive and operate in accordance with a second supply voltage having a second predetermined operating voltage different from the first predetermined operating voltage; and
   a controller coupled to at least the second processor and configured to dynamically switch operation of the MP system between a first mode of operation and a second mode of operation by performing operations comprising:
      obtaining current scenario information of the MP processing system;
      comparing the current scenario information with a scenario information stored in a learning system database, the scenario information stored in the learning system database comprising L1 cache miss rate information and load information;
      if the current scenario information matches the scenario information stored in the learning system database, switching operation of the plurality of processors between the first mode of operation and the second mode of operation in accordance with the matched scenario information, wherein:

in the first mode of operation, the first processor and the second processor perform symmetric multi-processing (SMP); and in the second mode of operation, the first processor and the second processor perform asymmetric multi-processing (ASMP);

if no scenario information match is found in the learning system database, a dynamic SMP/ASMP selection and learning system training is performed by operations comprising:

monitoring an L1 cache miss rate of the second processor;

comparing the L1 cache miss rate to a first threshold;

if the L1 cache miss rate exceeds the first threshold, a current processing mode is ASMP, and a load of the first processor is light according to a second threshold, switching the MP processing system to SMP mode;

if the L1 cache miss rate does not exceed the first threshold, the current processing mode is SMP, and the load of the first processor is heavy and unbalanced, switching the MP processing system to ASMP mode; and when the MP processing system is switched from ASMP mode to SMP mode or from SMP mode to ASMP mode, recording the current scenario information into the learning system database.

2. The MP processing system in accordance with claim 1, further comprising:

a third processor configured to only receive and operate in accordance with the first clock signal and the first supply voltage during both the first mode and second mode of operations.

3. The MP processing system in accordance with claim 2, further comprising:

a fourth processor configured to only receive and operate in accordance with the first clock signal and the first supply voltage during both the first mode and second mode of operations.

4. The MP processing system in accordance with claim 3, further comprising:

a fifth processor, a sixth processor, a seventh processor and an eighth processor each configured to only receive and operate in accordance with the first clock signal and the first supply voltage during both the first mode and second mode of operations.

5. The MP processing system in accordance with claim 1, further comprising:

a clock generation circuit coupled to the controller and configured to generate and output the first clock signal and the second clock signal, the first clock signal output to the first processor;

an operating voltage generation circuit coupled to the controller and configured to generate and output the first supply voltage to the first processor and output the second supply voltage to the second processor; and a switching circuit disposed between the clock generation circuit and the second processor and configured to receive the first clock signal and the second clock signal and output the first clock signal or the second clock signal to the second processor, wherein during the first mode of operation the first clock signal is output to the second processor and during the second mode of operation the second clock signal is output to the second processor;

wherein during the first and second modes of operation the first clock signal is output to the first processor.

6. The MP processing system in accordance with claim 1, further comprising:

a voltage regulator circuit coupled to the controller and configured to:

generate and output the second supply voltage to the second processor when in the second mode of operation, and output the first supply voltage to the second processor when in the first mode of operation.

7. The MP processing system in accordance with claim 1, further comprising:

a clock generation and switching circuit coupled to the controller and configured to generate the first clock signal and the second clock signal and glitchlessly switch between the first clock signal or the second clock signal for output to the second processor.

8. The MP processing system in accordance with claim 1, further comprising:

cache memory coupled to the first and second processors; and a clock-domain crossing (CDC) and bypass circuit responsive to the controller and coupled to the second processor and the cache memory, and further configured to provide a clock-domain crossing function between the second processor and the cache memory during the second mode of operation and provide a bypassing function during the first mode of operation.

9. The MP processing system in accordance with claim 1 wherein the controller comprises at least one of a finite state machine (FSM), a processor, a microcontroller or logic circuitry.

10. The MP processing system in accordance with claim 1 wherein the MP processing system is disposed on a single semiconductor substrate.

11. The MP processing system of claim 1, wherein the scenario information stored in the learning system database further comprises memory bandwidth information.

12. An apparatus, comprising:

a plurality of processors configured to perform multiprocessing functions, the plurality of processors comprising a plurality of first processors configured to receive and operate in accordance with a first clock signal having a first predetermined frequency and a first supply voltage having a first predetermined operating voltage and a second processor configured to receive and operate in accordance with either the first clock signal or a second clock signal having a second predetermined frequency different from the first predetermined frequency and receive and operate in accordance with a second supply voltage having a second predetermined operating voltage different from the first predetermined operating voltage;

a controller coupled to at least the second processor and configured to:

control operation of the second processor in a first mode of operation and a second mode of operation; and dynamically switch operation of the second processor between the first mode of operation and the second mode of operation;

a clock generation circuit coupled to the controller and configured to generate and output the first clock signal, the second clock signal, a first memory clock signal, and a second memory clock signal;

a first switching circuit disposed between the clock generation circuit and the second processor and configured to receive the first and second clock signals and select one for output to the second processor, wherein the first clock signal is input to each of the plurality of first processors at all times while each first processor is operating;

cache memory coupled to and configured for use with the plurality of first processors, wherein the cache memory comprises a first cache memory portion and a second cache memory portion, and wherein the first memory clock signal is input to the first cache memory portion at all times;

a second switching circuit disposed between the clock generation circuit and the second cache memory portion and configured to receive the first and second memory clock signals and select one for output to the second cache memory portion;

a clock-domain crossing (CDC) circuit coupled to each of the plurality of first processors and the first cache memory portion, and further configured to provide a CDC function between each of the plurality of first processors and the first cache memory portion; and a CDC and bypass circuit responsive to the controller and coupled to the second processor and the second cache memory portion, and further configured to provide a CDC function between the second processor and the second cache memory portion during the second mode of operation and provide a bypassing function during the first mode of operation; wherein when in the first mode of operation, the second processor receives and operates in accordance with the first clock signal and the first supply voltage;

when in the second mode of operation, the second processor receives and operates in accordance with the second clock signal and the second supply voltage; and each of the plurality of first processors is further configured to receive and operate in accordance with the first clock signal and the first supply voltage at all times while each first processor is operating.

13. The apparatus in accordance with claim 12 wherein the plurality of first processors further comprises a fourth processor.

14. The apparatus in accordance with claim 13 wherein the plurality of first processors further comprises:
a fifth processor, a sixth processor, a seventh processor and an eighth processor.

15. The apparatus in accordance with claim 12, further comprising:
an operating voltage generation circuit coupled to the controller and configured to:
output the first supply voltage to the plurality of first processors and the second processor during the first mode of operation; and
output the first supply voltage to the plurality of first processors and output the second supply voltage to the second processor during the second mode of operation.

16. The apparatus in accordance with claim 12 wherein the apparatus is disposed on a single semiconductor substrate.

17. The apparatus in accordance with claim 15, further comprising:
a voltage regulator and bypass circuit configured to:
receive a first operating voltage signal;
generate a second operating voltage signal from the first operating voltage signal;
output the first operating voltage signal for input to the second processor during the first mode of operation; and
output the second operating voltage signal for input to the second processor during the second mode of operation.

18. The apparatus in accordance with claim 12 wherein the controller comprises at least one of a finite state machine (FSM), a processor, a microcontroller or logic circuitry.

19. The apparatus of claim 12, wherein the first switching circuit is configured to glitchlessly switch between the first clock signal or the second clock signal for output to the second processor.

20. A method of switching a plurality of processors between a symmetric multiprocessing (SMP) mode and an asymmetric multiprocessing (ASMP) mode, the method comprising:
inputting a first clock signal and a first supply voltage to a plurality of first processors of the plurality of processors and operating each of the plurality of first processors in accordance with the first clock signal having a first predetermined frequency and the first supply voltage having a first predetermined operating voltage at all times while the first processors are operating;
inputting the first clock signal and a second clock signal to a first switching circuit and selecting, by the first switching circuit, one of the first clock signal and the second clock signal for output to a second processor of the plurality of processors;
inputting a first memory clock signal to a first cache memory portion of a cache memory at all times, wherein the cache memory is coupled to and configured for use with the plurality of processors;
inputting the first memory clock signal and a second memory clock signal to a second switching circuit and selecting, by the second switching circuit, one of the first memory clock signal and the second memory clock signal for output to a second cache memory portion of the cache memory;
providing a clock-domain crossing function between each of the plurality of first processors and the first cache memory portion;
receiving a mode selection signal;
operating the second processor in a first mode of operation or a second mode of operation in response to the mode selection signal, comprising:
in the first mode of operation, outputting the first clock signal to the second processor, inputting the first supply voltage to the second processor, operating the second processor in accordance with the first clock signal and the first supply voltage, and providing a bypassing function between the second processor and the second cache memory portion; and
in the second mode of operation, outputting the second clock signal to the second processor, inputting a second supply voltage to the second processor, operating the second processor in accordance with the second clock signal having a second predetermined frequency different from the first predetermined frequency and in accordance with the second supply voltage having a second predetermined operating voltage different from the first predetermined operating voltage, and providing a clock-domain crossing function between the second processor and the second cache memory portion;
wherein each of the plurality of first processors is further configured to only receive and operate in accordance with the first clock signal and the first supply voltage at all times while each first processor is operating.

21. The method in accordance with claim 20 further comprising:
operating a third processor in accordance with the first clock signal and the first supply voltage at all times while the third processor is operating.

22. The method in accordance with claim 21 further comprising:
operating a fourth processor in accordance with the first clock signal and the first supply voltage at all times while the fourth processor is operating.

23. The method in accordance with claim 22 further comprising:
operating a fifth processor, a sixth processor, a seventh processor and an eighth processor each in accordance with the first clock signal and the first supply voltage at all times while each respective fifth, sixth, seventh and eighth processor is operating.

24. The method in accordance with claim 20, further comprising:
receiving the first supply voltage; and
generating the second supply voltage from the received first supply voltage.

25. The method in accordance with claim 20, further comprising:
glitchlessly switching between the first clock signal and the second clock signal for input to the second processor.

26. The method in accordance with claim 20, wherein the mode selection signal is generated based on a determination that load conditions are unbalanced.

27. The method in accordance with claim 20 wherein the method is performed by circuitry within a single semiconductor substrate.

28. The method of claim 20, wherein the mode selection signal is generated based on memory bandwidth information.

29. The method of claim 20, wherein the mode selection signal is further based on use information.

30. A method for switching a processing system having a plurality of processors between a symmetric multiprocessing (SMP) mode and an asymmetric multiprocessing (ASMP) mode, the method comprising:
obtaining current scenario information of the processing system;
comparing the current scenario information with a scenario information stored in a learning system database;
if the current scenario information matches the scenario information stored in the learning system database, switching a mode of operation of the plurality of processors between the SMP mode and the ASMP mode in accordance with the matched scenario information, wherein:
the scenario information includes L1 cache miss rate and load information;
in a first mode of operation, the plurality of processors perform symmetric multi-processing (SMP); and
in a second mode of operation, the plurality of processors perform asymmetric multi-processing (ASMP);
if no scenario information match is found in the learning system database, a dynamic SMP/ASMP selection and learning system training is performed by operations comprising:
monitoring an L1 cache miss rate of a processor of the plurality of processors;
comparing the L1 cache miss rate to a first threshold;
if the L1 cache miss rate exceeds the first threshold, a current processing mode is ASMP, and a load of another processor is light according to a second threshold, switching the processing system to SMP mode;
if the L1 cache miss rate does not exceed the first threshold, the current processing mode is SMP, and a load of the other processor is heavy and unbalanced, switching the processing system to ASMP mode; and
when the processing system is switched from ASMP mode to SMP mode or from SMP mode to ASMP mode, recording the current scenario information into the learning system database.

* * * * *

UNITED STATES PATENT AND TRADEMARK OFFICE
CERTIFICATE OF CORRECTION

PATENT NO. : 10,928,882 B2  
APPLICATION NO. : 14/580044  
DATED : February 23, 2021  
INVENTOR(S) : Chen et al.

Page 1 of 1

It is certified that error appears in the above-identified patent and that said Letters Patent is hereby corrected as shown below:

On the Title Page

Page 2, Column 2, item [56], Line 19, delete "Reponse" and insert --Response-- therefor Page 2, Column 2, item [56], Line 27, delete "filedf" and insert --filed-- therefor Page 3, Column 1, item [56], Line 3, delete "Respoonse" and insert --Response-- therefor Page 3, Column 2, item [56], Line 2, delete "2017"," and insert --2018",-- therefor Page 3, Column 2, item [56], Line 9, delete "Applicaton" and insert --Application-- therefor In the Claims Column 33, Line 6, Claim 12, after "of", delete "first"

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*